United States Patent [19]
Tatarazako

[11] Patent Number: 5,671,142
[45] Date of Patent: Sep. 23, 1997

[54] APPARATUS AND METHOD FOR CONTROLLING DAMPING FORCE EXHIBITED IN VEHICULAR DAMPING FORCE VARIABLE SHOCK ABSORBER

[75] Inventor: Takahisa Tatarazako, Mooka, Japan

[73] Assignee: Nissan Motor Co., Ltd., Kanagawa, Japan

[21] Appl. No.: 518,513

[22] Filed: Aug. 23, 1995

[30] Foreign Application Priority Data

Aug. 23, 1994 [JP] Japan .................................. 6-198636

[51] Int. Cl.$^6$ .................................................. B60G 17/015
[52] U.S. Cl. ................................. 364/424.046; 280/707
[58] Field of Search ................... 364/424.046, 424.047; 280/707, 840

[56] References Cited

U.S. PATENT DOCUMENTS

| | | | |
|---|---|---|---|
| 5,103,396 | 4/1992 | Hiwatashi et al. | 280/707 |
| 5,276,621 | 1/1994 | Henry et al. | 280/707 |
| 5,289,380 | 2/1994 | Kimura | 364/424.046 |
| 5,365,432 | 11/1994 | Kakizaki et al. | 280/707 |
| 5,377,107 | 12/1994 | Shimizu et al. | 364/424.046 |
| 5,430,646 | 7/1995 | Kimura et al. | 280/707 |
| 5,445,405 | 8/1995 | Onozawa et al. | 280/707 |
| 5,515,274 | 5/1996 | Mine et al. | 280/707 |
| 5,515,277 | 5/1996 | Mine | 280/707 |

FOREIGN PATENT DOCUMENTS 3-42319  2/1991  Japan .

*Primary Examiner*—Gary Chin
*Attorney, Agent, or Firm*—Lowe, Price, LeBlanc & Becker

[57] ABSTRACT

In a suspension control system for a vehicle having a plurality of damping force variable shock absorbers, at least either or both of positive and negative dead zone threshold values ($\pm X_{2io'}$) are reduced to a predetermined value ($X_{2ioo'}$), for example, zero until a zero crossing counter CNT indicates a predetermined value $CNT_0$, the zero crossing counter CNT counting the number of time a vertical sprung mass velocity $X_{2f'}$ crosses a zero point thereof, when an absolute value $|X_{2f'}|$ of the sprung mass vertical velocity oscillated due to oscillation inputs from a running road surface is equal to or exceeds a predetermined positive or negative sprung mass vertical velocity upper or lower limit threshold value ($X_{2i1'}$).

17 Claims, 16 Drawing Sheets

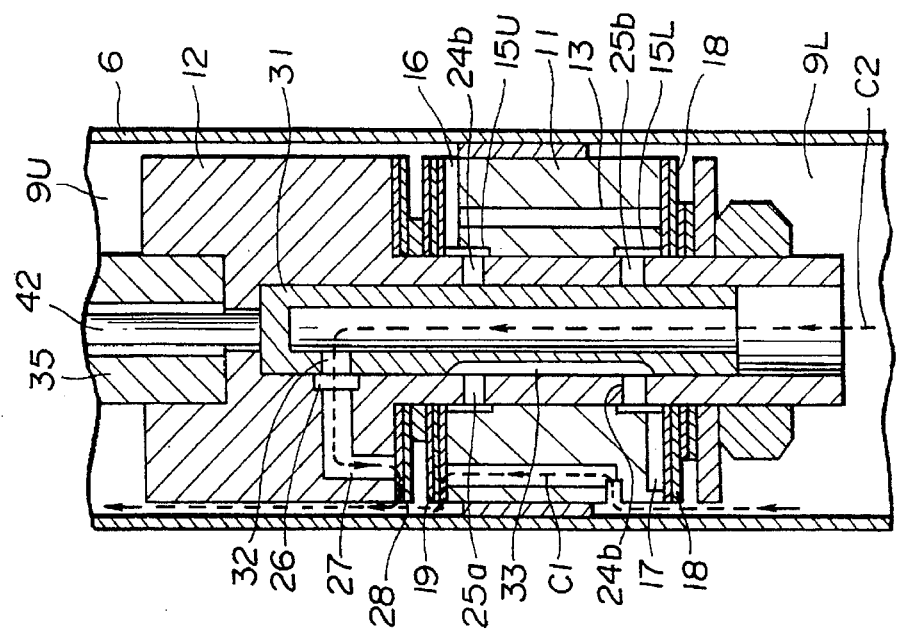
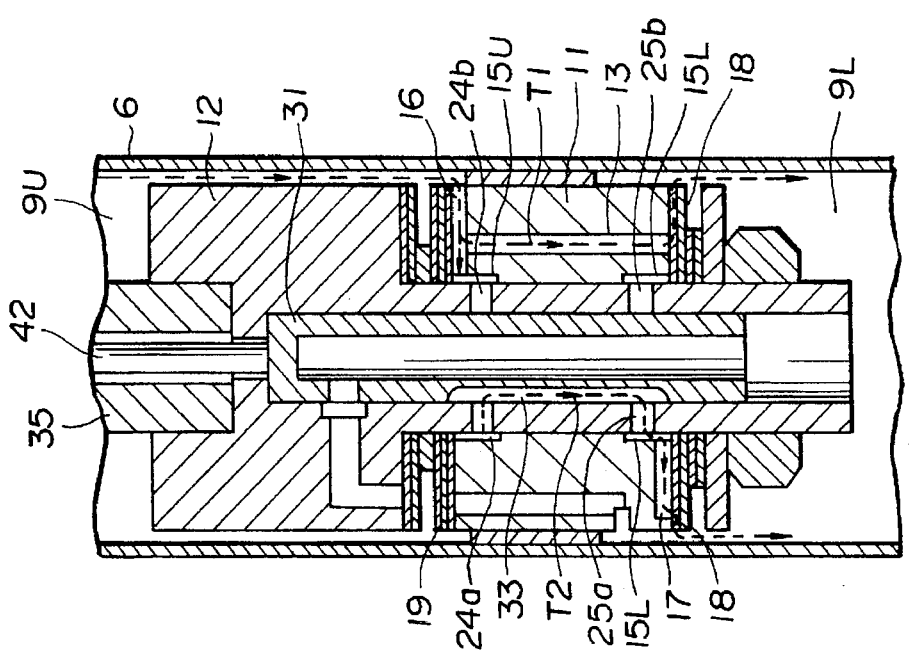

(EXTENSION PHASE OF POSITION B)

(COMPRESSION PHASE OF POSITION B)

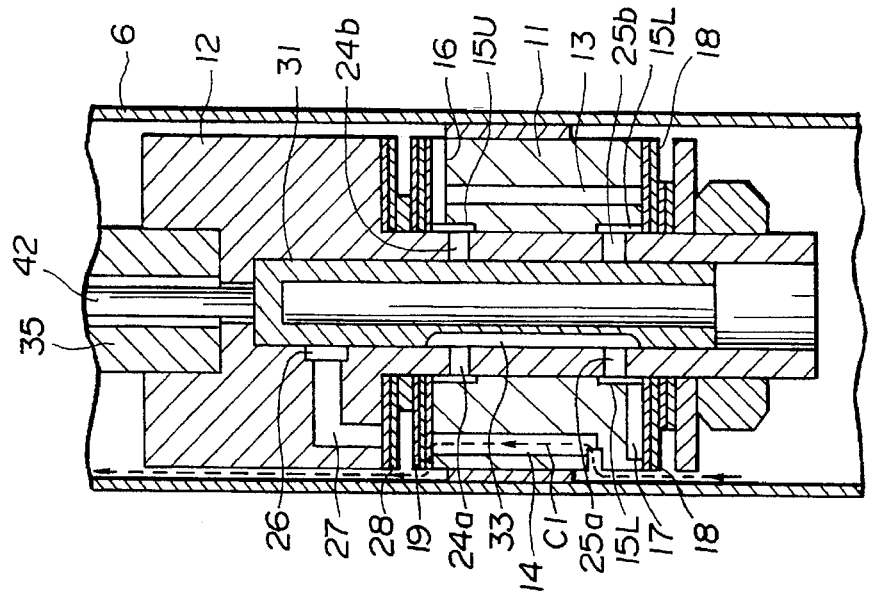
FIG.6A (EXTENSION PHASE OF POSITION C)
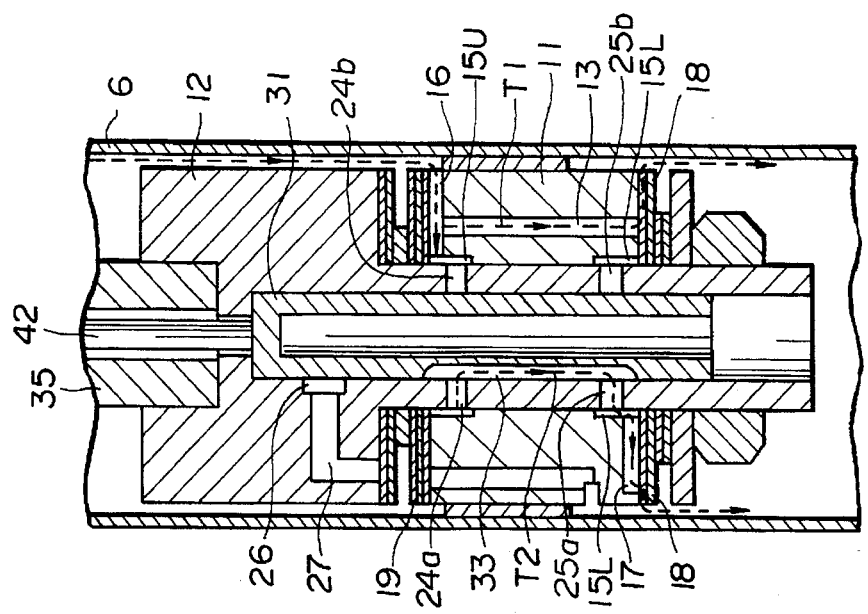
FIG.6B (COMPRESSION PHASE OF POSITION C)

NOTES: 1) D/F HAS A LINEAR RELATIONSHIP TO THE POSITION; AND
2) D/F AT THE S-S REGION IS DENOTEDY BY MIN(=0).

NOTES: 1) D/F HAS A LINEAR RELATIONSHIP TO THE POSITION; AND
2) D/F AT THE S-S REGION IS DENOTED BY MIN(=0).

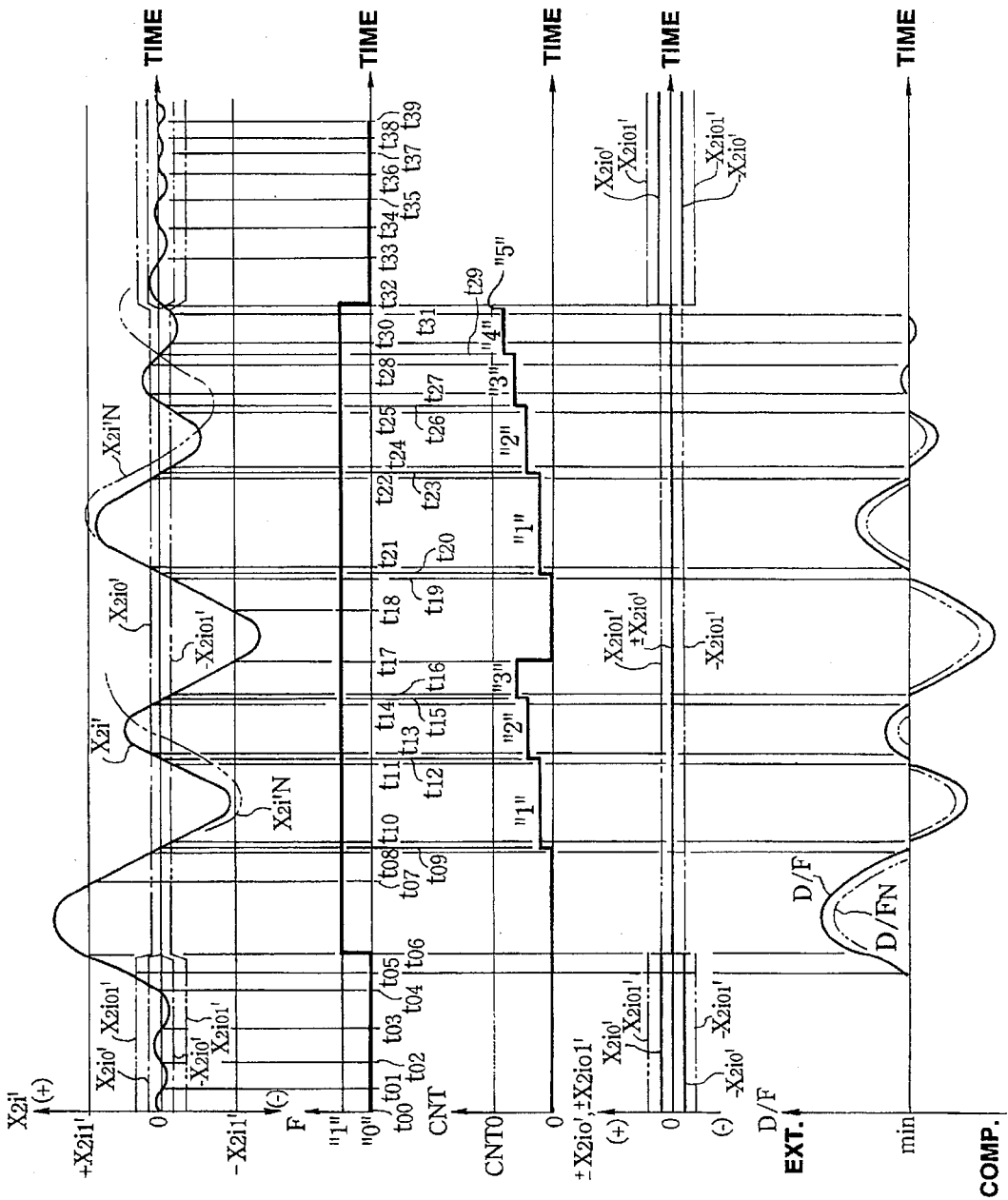

APPARATUS AND METHOD FOR CONTROLLING DAMPING FORCE EXHIBITED IN VEHICULAR DAMPING FORCE VARIABLE SHOCK ABSORBER

BACKGROUND OF THE INVENTION

The present invention relates to an apparatus for controlling a variable damping force exhibited in a vehicular damping force variable shock absorber and method therefor on the basis of a sky hook theory using at least a sprung mass (vehicular body) displacement velocity.

Various types of vehicular semi-active suspension control systems have been proposed.

A Japanese Patent Application First Publication No. Hesei 3-42319 published on Feb. 22, 1991 exemplifies one of the various types of vehicular semi-active suspension control systems.

The semi-active suspension control system disclosed in the above-identified Japanese Patent Application Publication includes: at least one shock absorber which is capable of changing an (extension phase) damping force in a direction toward which the shock absorber is extended and of changing a compression phase damping force in a direction toward which the shock absorber is contracted (or compressed) to a relatively soft damping force (or simply referred herein to as a low damping force side) and to a relatively hard damping force (or simply referred herein to as a high damping force side), respectively,; means for measuring a sprung mass velocity, the sprung mass corresponding to a vehicle body; means for measuring a relative velocity between the sprung mass and unsprung mass, the unsprung mass corresponding to each one of road wheels; means for determining whether a sign (plus or minus) of the sprung mass velocity is coincident with that of the relative velocity between the sprung mass and the unsprung mass; and control signal outputting means for generating and outputting a control signal so that the extension phase damping force of the shock absorber is set to the high damping force side and the compression phase damping force is set to the low damping force side when both signs are coincident to each other and the relative velocity between the sprung mass and unsprung mass indicates positive (upward with respect to the vehicle body means positive), for generating and outputting the control signal so that the extension phase damping force is set to the low damping force side and the compression phase damping force is set to the high damping force side when both signs are coincident to each other and the relative velocity described above indicates negative (downward with respect to the vehicle body means positive), and for generating and outputting the control signal so that both extension and compression phase damping forces are set to the low damping force sides when both signs are different from each other.

It is noted, however, that the high and low damping force sides to be set at either of the extension or compression phase of each shock absorber disclosed in the above-identified Japanese Patent Application First Publication give only constant (fixed) values. That is to say, each damping force variable shock absorber used in the above-exemplified suspension control system has, specifically, constant large damping forces to be set at either of the extension or compression phase. If the constant large damping force is set at the extension phase, the constant small damping force is, in turn, set at the compression phase. If the constant high damping force is set at the compression phase, the constant low damping force is, in turn, set at the extension phase. In addition, the constant small damping forces can be set at both of the extension and compression phase. In other words, in each shock absorber disclosed in the above-identified Japanese Patent Application First Publication, each damping force at the extension and compression phases can only be set at, so called, three fixed positions.

On the other hand, from viewpoints of improvements in a vehicular body vibration (oscillation) suppression effect and vehicle body posture (attitude) control, a, so-called, Sky Hook theory has been taken to attention. In order to achieve this Sky Hook theory in the vehicle in accordance with, so called, Karnopp rule, it is necessary for each damping force of the respective shock absorbers to be continuously varied and set with respect to a magnitude and direction of behavior variables to be emanated on the vehicle body, specifically, oscillation inputs, for example, sprung mass vertical velocities at the respectively road wheel arranged positions of the vehicle body or so forth.

SUMMARY OF THE INVENTION

It is, therefore, a principal object of the present invention to provide an apparatus for controlling a damping force exhibited in a vehicular shock absorber and a method therefor which achieve a superior riding comfort and stability feeling for a vehicular occupant with a trade-off between smoothness in riding comfort and rigidity riding sensations being compatible.

The above-described object can be achieved by providing a control apparatus for an automotive vehicle, comprising: a) determining means for determining a behavior of a vehicle body and outputting a signal related to a sprung mass vertical velocity with respect to the vehicle body; b) controlling means, responsive to the signal derived from said determining means, for calculating a damping force according to a magnitude and direction of the output signal from said determining means and for outputting a control signal corresponding to the calculated damping force; c) actuating means, responsive to said control signal output from said controlling means, for actuating a valve body associated with said actuating means to rotate from a position through an angle to a target position determined according to a magnitude and direction of the control signal output from said controlling means; d) damping means, interposed between a sprung mass member of the vehicle and an unsprung mass member of the vehicle and having the valve body, a piston assembly, and upper and lower working fluid chambers defined by said piston assembly, for providing a target damping force at least either of extension or compression phase determined according to the rotated target position of said valve body and whether said target damping force is exhibited at either of the extension phase or compression phase being dependent upon a vertical movement of the piston assembly with respect to the vehicle body; e) dead zone setting means for setting positive and negative dead zone threshold values defining a dead zone in which said controlling means does not output said control signal to said actuating means according to the magnitude and direction of the output signal of said determining means so that said valve body is not rotated from said position and each of the damping forces at both extension and compression phases emanated from said damping means gives a minimum damping force; f) positive and negative sprung mass vertical velocity upper and lower limit threshold value setting means for setting positive and negative sprung mass vertical velocity upper and lower limit threshold values, whose absolute values are larger than those of said positive and negative dead zone threshold values, said controlling means outputting the control signal to said actuating means so that said valve body is rotated to a maximum target position so as to provide a maximum damping force at either of said extension or compression phase depending on at least a direction of the output signal from said determining means when said output signal of said determining means becomes equal to or exceeded said either of positive or negative sprung mass vertical velocity upper or lower limit threshold value; and g) dead zone threshold value changing means for reducing an absolute value of at least either of said positive or negative dead zone threshold value by a predetermined value when said output signal of said determining means becomes equal to or exceeded either of said positive or negative sprung mass vertical velocity upper or lower limit threshold value.

The above-described object can also be achieved by providing a method for controlling a damping force emanated from a vehicular shock absorber interposed between a sprung mass member and an unsprung mass member of a vehicle, the method comprising the steps of: a) determining a behavior of a vehicle body and outputting a signal related to a sprung mass vertical velocity with respect to the vehicle body; b) responsive to the signal derived from said step a), calculating a damping force according to a magnitude and direction of the output signal from said step a) and outputting a control signal corresponding to the calculated damping force; c) responsive to said control signal output from said step b), actuating a valve body installed within the shock absorber to rotate from a position through an angle to a target position determined according to a magnitude and direction of the control signal output from said step b); d) providing a target damping force at least either of extension or compression phase determined according to the rotated target position of said valve body, whether the controlled target position at either of the extension and compression phase depending upon a direction of a piston assembly installed with the valve body in the shock absorber; e) setting positive and negative dead zone threshold values defining a dead zone in which, at said step b), said control signal is not output at the step c) according to the magnitude and direction of the output signal of said step a) that said valve body is not rotated from said neutral position and each of the damping forces at both extension and compression phases emanated from said shock absorber gives a minimum damping force; f) setting positive and negative sprung mass vertical velocity upper and lower limit threshold values, whose absolute values are larger than those of said positive and negative dead zone threshold values, at said step c), the control signal being output at said step d) so that said valve body is rotated to a maximum target position so as to provide a maximum damping force at either of said extension or compression phase depending on the direction of the output signal from said step a) when said output signal of said step a) becomes equal to or exceeded said either of positive or negative sprung mass vertical velocity upper or lower limit threshold value; and g) reducing an absolute value of at least either of said positive or negative dead zone threshold value by a predetermined value when said output signal of said step a) becomes equal to or exceeded either of said positive or negative sprung mass vertical velocity upper or lower limit threshold value.

BRIEF DESCRIPTION OF THE DRAWINGS

FIGS. 4A and 4B are enlarged cross sectional views indicating the damping force adjusting mechanism at an intermediate damping force state during the rise of the vehicle body, FIG. 4A indicating a working fluid movement route at the extension phase and FIG. 4B indicating the working fluid movement route at the compression phase.

FIGS. 6A and 6B are enlarged cross sectional views, each indicating the damping force adjusting mechanism in a maximum damping force state during a lowering of the vehicle body, FIG. 6A indicating the extension phase working fluid movement route and FIG. 7A indicating the compression phase working fluid movement route.

FIG. 8 is a circuit configuration of a controller, vertical acceleration sensors, and stepping motors in the embodiment according to the present invention.

FIGS. 15A through 15E are explanatory views on the series of damping actions by means of the arithmetic operation processing (damping control routine) shown in FIGS. 14A and 14B.

BEST MODE CARRYING OUT THE INVENTION

Figure 1:
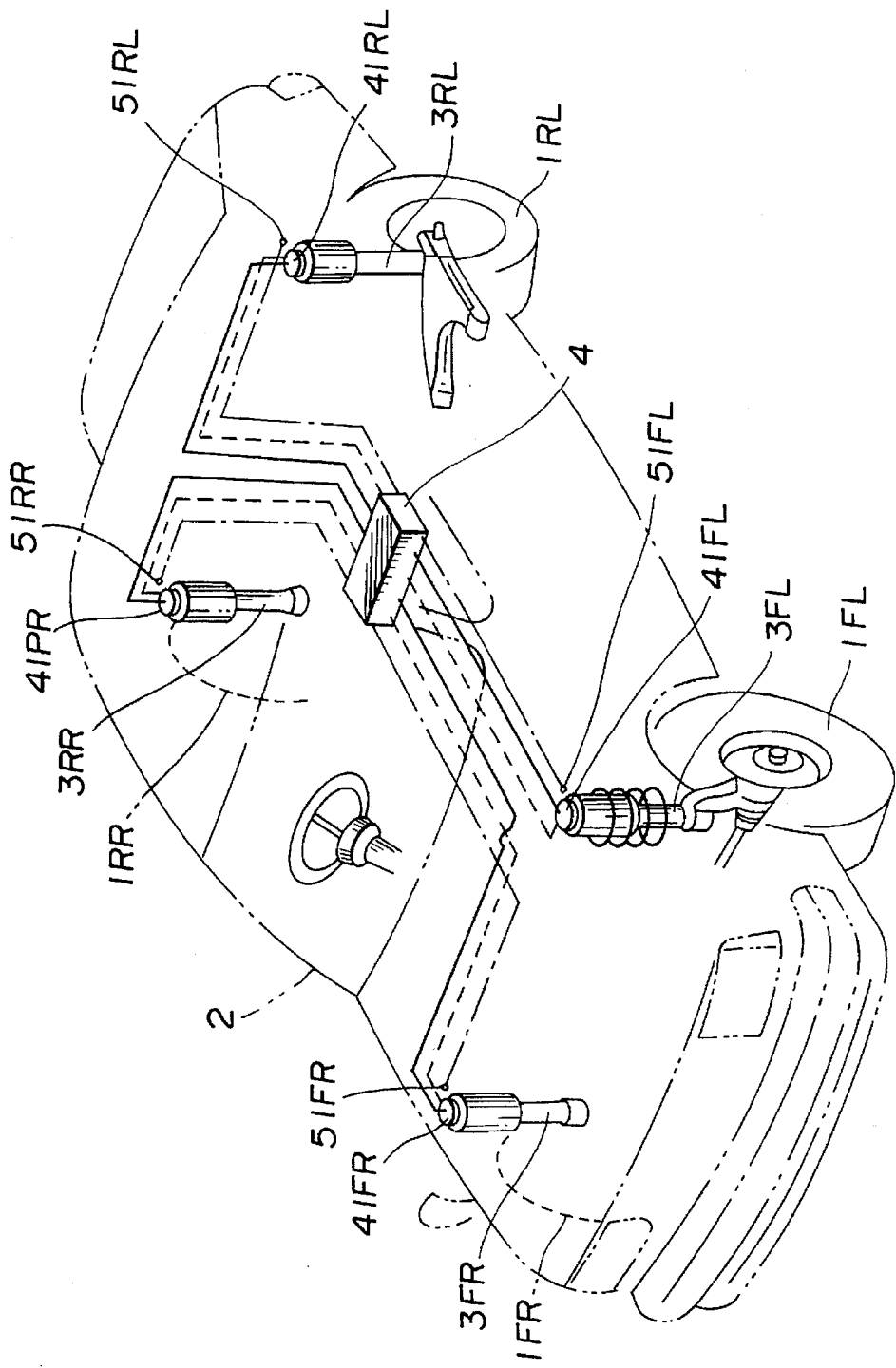
FIG. 1 is a general and basic configuration of an apparatus for controlling a damping force exhibited in at least one of vehicular shock absorbers in a embodiment according to the present invention.

Reference will hereinafter be made to the drawings in order to facilitate a better understanding of the present invention.

Before explaining a preferred embodiment of an apparatus for controlling a damping force of a vehicular shock absorber according to the present invention, a disclosed content of a Japanese Patent Application No. Heisei 5-328426 filed in Japan on Dec. 24, 1993 will be described below as a comparative example.

A suspension control system disclosed in the above-identified Japanese Patent Application uses a variable damping force shock absorber which will briefly be described.

At least one extension phase fluid flow passage and at least one compression phase fluid flow passage are formed between a piston installed internally in each shock absorber and a valve body installed within the piston, both fluid flow passages being automatically opened and closed by means of a disk-shaped valve or lead valve. When the valve body is relatively rotated or moved with respect to actuation by cording to an actuation by an actuator, an opening area between the piston and valve body interposed for each fluid flow passage, the opening area Therebetween serving as a variable orifice, is accordingly varied. Therefore, a throttling of the variable orifice (the throttling of the variable orifice indicates a fluid stream resistance and, simultaneously, corresponds to a damping coefficient of the damping force to be variably controlled via the shock absorber) is varied according to a control for a controlled variable for the actuator so that the damping force at either of an extension phase in which The piston is moved upward) or compression phase in which the piston is moved downward can independently and continuously be varied.

It is noted that, in the comparative example, The damping force at the compression phase provides the soft (small) damping force when the damping force at the extension phase is relatively hard (large) damping force and the damping force at the extension phase, in turn, provides the soft damping force when the damping force at the compression phase is relatively hard (large) damping force. This, per se, is generally the same as the three fixed positions described in the BACKGROUND OF THE INVENTION. However, in the comparative example, the damping force set to the high damping force side at either of the extension or compression phase can continuously be varied. Furthermore, a stepping motor is specifically used as the actuator. As the above-described controlled variable. a revolution angle of the stepping motor. i.e., the number of seeps (more specifically, the number of pulses in a control signal applied to the stepping motor) is used. In other words, the damping force (=damping coefficient) at at least high damping force side has an uniform relationship to a relative revolution angle of the valve body having a linear relationship to the revolution angle of the stepping motor, namely, the revolved position of the valve body having a linear relationship to the revolution angle of the stepping motor.

In the suspension control system using the continuously variable damping force shock absorber disclosed in the above-identified Japanese Patent Application, a sprung mass (vehicle body) vertical velocity is calculated or measured in order to straightforwards achieve the Karnopp rule in the vehicle body, the damping force at the extension phase is gradually increased as the sprung mass vertical velocity is increased in a positive region (the vehicle body goes upward more than the original height position) and the damping force at the compression phase is gradually increased as the sprung mass vertical velocity is decreased in a negative region (the vehicle body goes downward more than the original height).

Although it is, of course, possible to perform a more precise control over the damping force (more strictly speaking, the damping force coefficients at the extension phase and compression phase, namely, the opening areas of the variable orifices and indicating the rotated position of the valve body) of the damping force variable shock absorber according to the variation in the sprung mass vertical velocity, However, in this comparative example case, since the damping force is sensitively enlarged with respect to the high frequency oscillation input from a road surface, the shock absorber gives a vehicular occupant an unpleasant feeling as if he rode a rigid car (rigid vehicle riding sensation) and causes an earlier deterioration of the actuator due to a repetitive positioning changes in the actuator.

In order to secure a smooth riding comfort, the damping force is set to the damping force side as small as possible in a region wherein the variation in the sprung mass vertical velocity is slow and a dead zone in which no damping force variable control is carried out is installed for the sprung mass vertical velocity so that the unpleasant feeling described above and the earlier deterioration of the actuator can be prevented from occurring.

However, if such a dead zone as described above is installed with the set small damping force, a time interval during which the damping force is small becomes longer by a time duration during which the sprung mass vertical velocity falls in the dead zone in terms of a time sequence when a large-amplitude sprung mass vertical velocity is oscillated in such a manner as to repeat passing from the extension phase side to the compression phase side and vice versa. The elongated time interval causes the vehicle body oscillation input not to be attenuated and converged, thus the oscillation of the vehicle body being left on the vehicle body so that this vehicle body oscillation gives the vehicular occupant another unpleasant feeling as if he rode a fluctuating car (vehicle body fluctuating sensation), namely, too soft feeling.

To solve only such a problem as described above, for example, with upper and lower threshold values defining the above-described dead zone previously set to small values. the damping force at either of the extension or compression phase may be set to the damping force side as large as possible even if minute vehicle body oscillations are input and a gain of the whole suspension control system may be enlarged. However, if the gain thereof is uniformly enlarged regardless of the magnitude of the vehicle body oscillations, the damping force emanated from the shock absorber becomes, in turn, too large for an occurrence of the small-amplitude, high-frequency wave oscillation input so that, especially, the damping force variable shock absorber in the comparative example gives the vehicular occupant another unpleasant feeling as if he rode the solid (rigid) car and the vehicle were running on a rugged road surface when the vehicle especially runs under a middle-and-high speed running condition.

Therefore, the present invention has solved the above-described problem.

Next, FIG. 1 shows a general configuration of an apparatus for controlling a damping force exerted in a vehicular shock absorber in a preferred embodiment according to the present invention.

In FIG. 1, a front left road wheel is denoted by 1FL, a front right road wheel is denoted by 1FR, a rear left road wheel is denoted by 1RL, a rear left road wheel is denoted by 1RR, and a rear right road wheel is denoted by 1RR. A vehicle body is denoted by 2. Each damping force variable shock absorber 3FL through 3RR is interposed between each corresponding one of the road wheels 1FL through 1RR and the vehicle body 2. Each stepping motor 41FL through 41RR to change the damping force exerted in each corresponding one of the shock absorbers 3FL through 3RR is controlled according to a control signal generated and output from a controller 4 as will be described later.

FIGS. 2, 3, 4A, 4B, 5A, 5B, 6A, and 6B show a structure of a representative one of the damping force variable type shock absorbers 3FL through 3RR.

Figure 2:
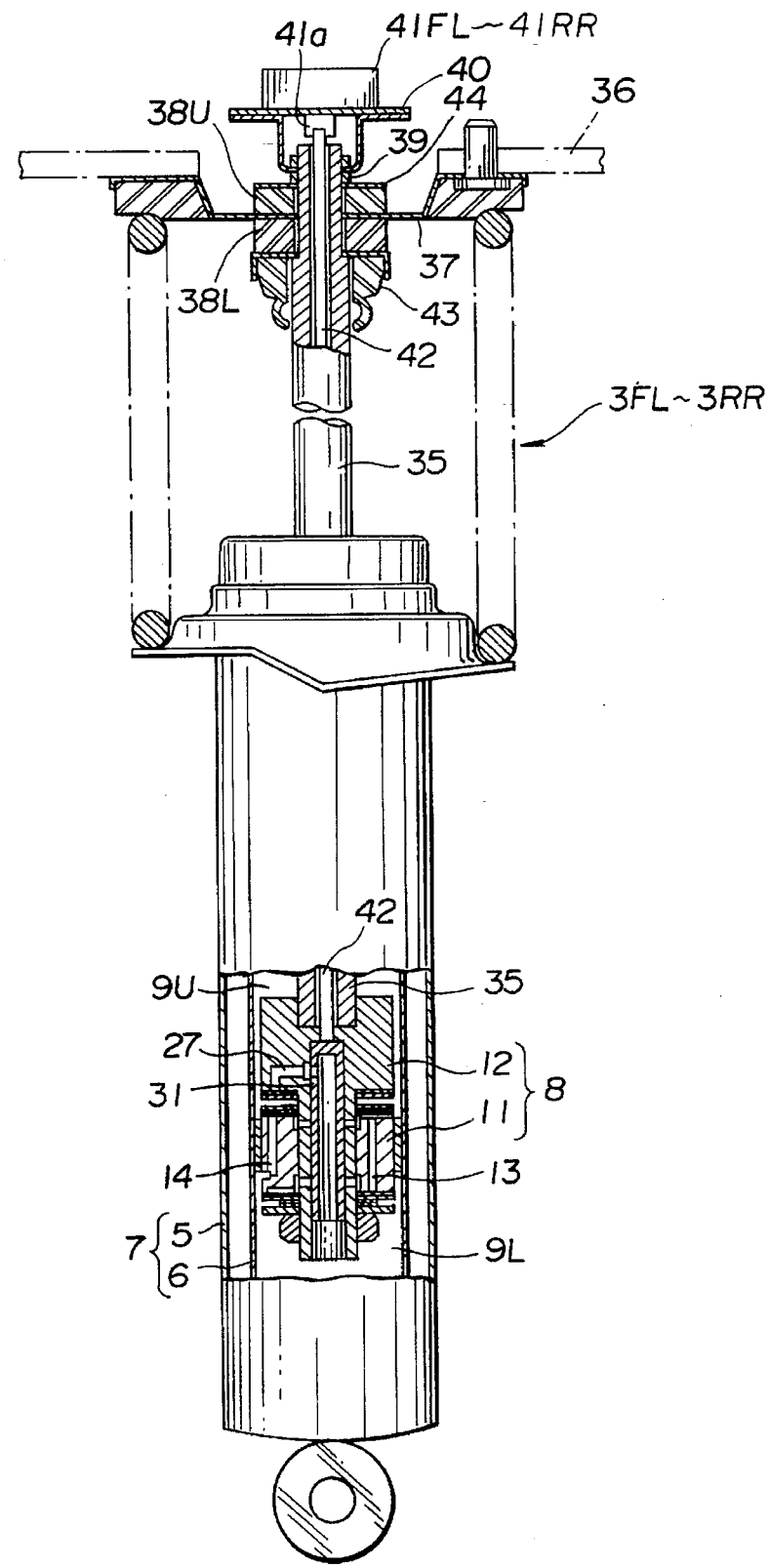
FIG. 2 is a partially cross-sectioned longitudinal view of a representative shock absorber and associated stepping motor to which the embodiment according to the present invention is applicable.

As typically shown in FIG. 2, each damping force variable shock absorber 3FL through 3RR is constituted by, so-called, twin-tube, gas-filled strut type shock absorber having cylindrical tubes 7, the cylindrical tubes 7 being constituted by an outer envelope 5 and an inner envelope 6, the inner envelope 6 defining upper and lower pressure chambers 9U and 9L together with a piston assembly 8, the piston assembly 8 being slidably contacted with the inner envelope 6.

The piston assembly 8, as appreciated especially from FIGS. 3 through 6B, includes: a cylindrical lower half piston body 11 having an outer peripheral surface molded with a sealing member 9 which is slidably contacted against the inner envelope 6 and having a center opening hole 10 on the inner peripheral surface; and an upper half piston body 12 internally fitted into the lower half piston body 11 at the center opening hole 10.

Then, the upper half piston body 11 includes: an extension phase working fluid flow passage penetrated vertically through the lower half piston body 11; a compression phase working fluid flow passage 14 constituted by a hole 14a having a diameter larger than the extension phase working fluid passage 13, the one hole 14a being penetrated from an upper surface downward to a lowest end of the seal member 9 and another hole 14b penetrated from the outer peripheral surface of a cylindrical body 11 to the bottom end of the hole portion 14a; circular ring-shaped grooves 15U and 15L formed on upper and lower opening ends of the center opening hole 10; an elongated groove 16 formed on the lower end of the lower half piston body 11 and which is communicated with the circular ring-shaped groove 15U and the hydraulic working fluid passage 13; and another elongated groove 17 formed on the lower end of the lower half piston body 11 and communicated with the circular groove 15L.

An extension phase disk valve 18 serves to close (is used to close) the lowest surface side of the extension phase working fluid flow passage 13 and the elongated groove 17. A compression phase disk valve 19 serves to close (is used to close) the upper end of the compression phase working fluid passage 14.

In addition, the upper half piston body 12 includes: a small-diameter axle portion 21 inserted into the center opening hole 10 of the lower half piston body 11; and a larger-diameter axle portion 22 having a smaller diameter than an inner diameter of the inner envelope 6 and formed integrally to an upper end of the small-diameter axle portion 21. A penetrating hole 23, located at a center position of these axle portions 21 and 22, is constituted by: a hole portion 23a penetrated from the lowest end surface side of the small-diameter axle portion 21 to an intermediate portion of the larger-diameter axle portion 22; a smaller-diameter hole portion 23b communicated with the upper end of the hole portion 23a having a diameter smaller than that of the hole 23a; and a hole portion 23b communicated with the upper end of the hole portion 23a and having a larger diameter than the hole portion 23a. Pairs of penetrating holes 24a and 24b and 25a and 25b are penetrated through the inner peripheral surface in the radial direction at positions opposing to the circular grooves 15U and 15L constituting the smaller-diameter axle portion 21. An arc-shaped groove 26 communicated with the upper end of the hole 23a of larger-diameter axle portion 22 is formed on the upper end surface of the hole portion 23a. Together with the arc-shaped groove 26 formed on the upper end of the hole 23a of the larger-diameter axle portion 22 which is communicated with the hole 23a, a letter-L shaped compression phase working fluid passage 27 is formed which is communicated with the lower end surface of the arc-shaped groove 26. An opening portion located on the lowest end surface of the compression phase working fluid flow passage 27 is closed by means of the compression phase disk valve 28.

Then, a nut 29 is screwed into a lowest end of the smaller-diameter axle portion 21 projected downward from the lower half piston body 11 of the smaller-diameter axle portion 21 with the smaller diameter axle portion 21 inserted into the center opening hole 10 of the lower half piston body 11 so that both lower half piston body 11 and upper half piston body 12 are integrally linked to each other as the piston assembly 8.

Figure 3:
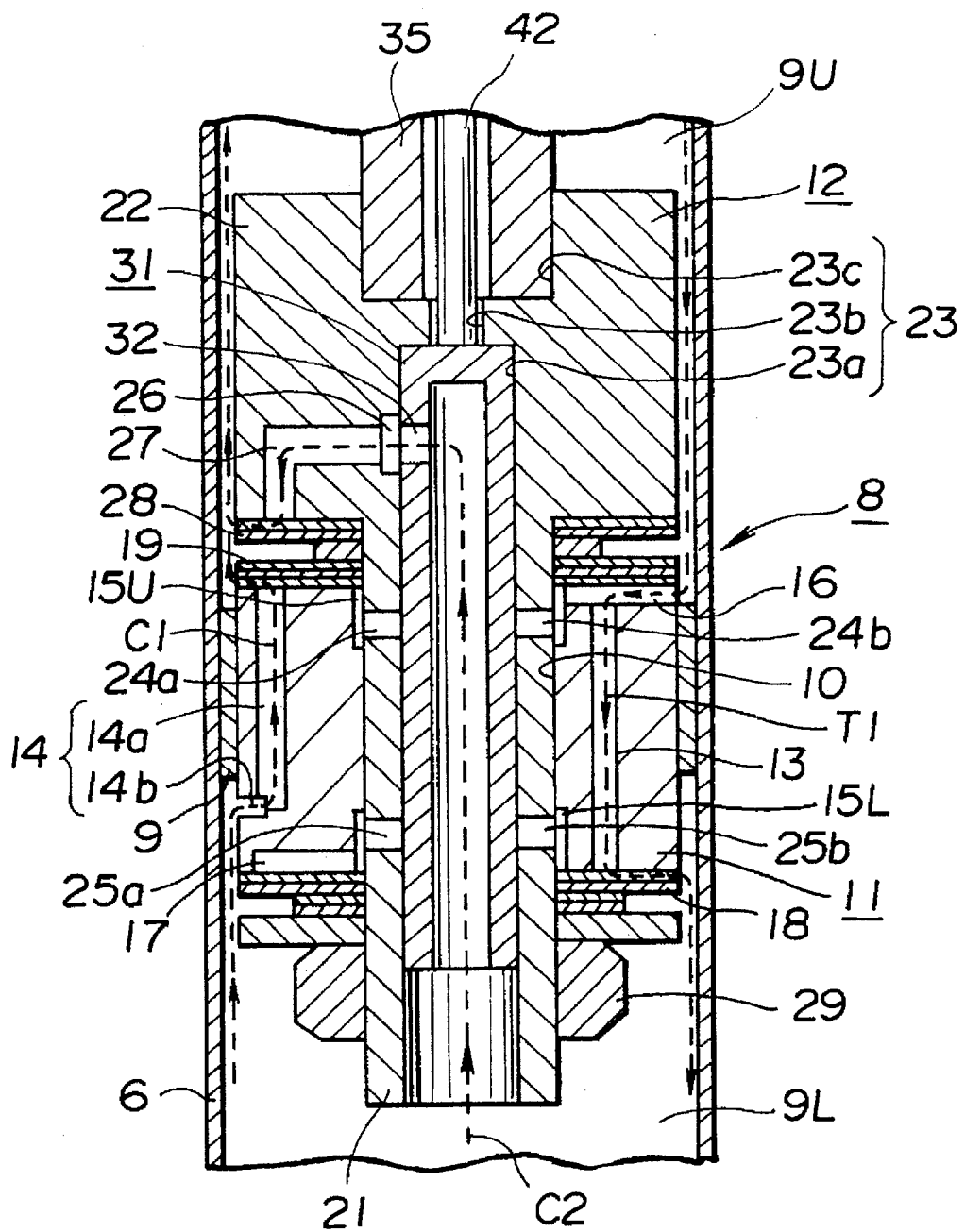

A valve body 31 in a cylindrical shape is rotatably disposed within the hole 23a of the upper half piston body 12, an upper end portion of the valve body 31 constituting a variable throttling portion and being closed. The valve body 31 is formed with a penetrating hole 32 located at a position thereof radially opposed to the arc-shaped groove 26 of the larger-diameter axle portion 22 located on the upper half piston body 12, the penetrating hole 32 being reached to the inner peripheral surface of the groove 26, as shown in FIG. 3. As shown in FIGS. 4A through 6B, a communicating groove 33 is formed on the outer peripheral surface of the valve body 31 corresponding to the one pair of penetrating holes 24a and 24b which are communicated with the other pair of penetrating holes 25a and 25b of the smaller-diameter axle portion 21 of the upper half piston body 12.

Figure 5A:
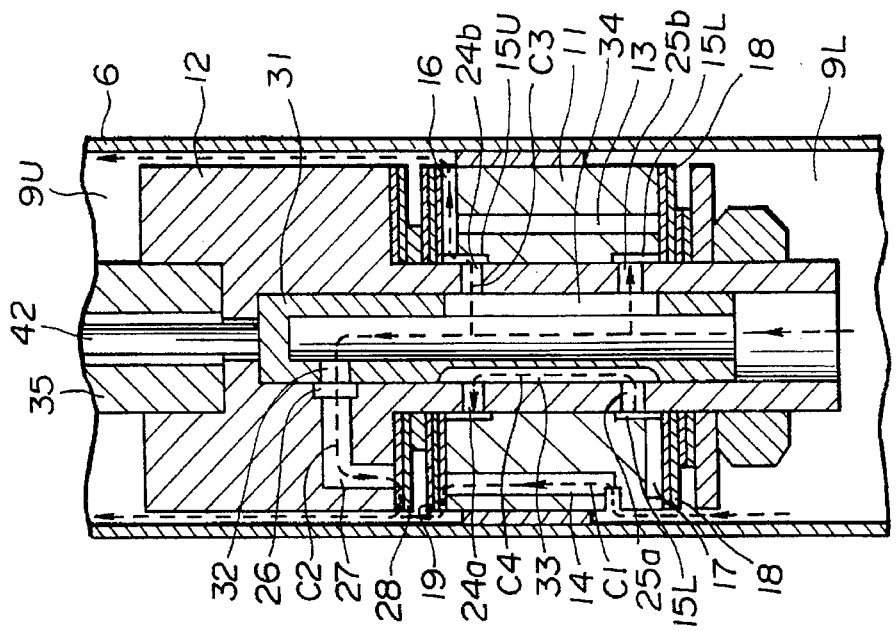
FIGS. 5A and 5B are enlarged cross sectional views, each indicating the damping force adjusting mechanism during no displacement of the vehicle body, FIG. 5A indicating the working fluid movement route at the extension phase and FIG. 5B indicating the working fluid movement route at the compression phase.
Figure 5B:
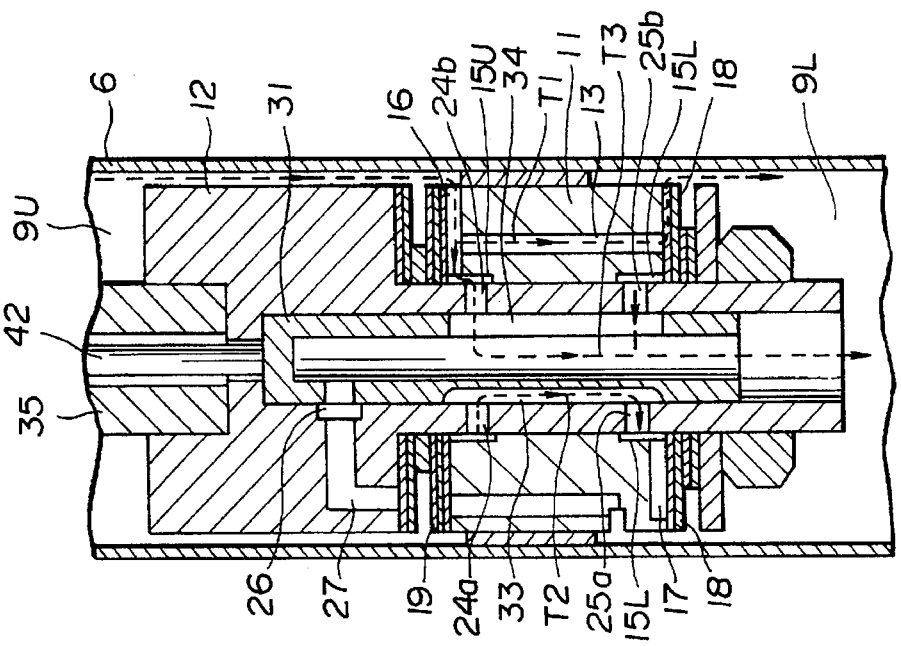

As shown in FIGS. 5A and 5B, an elongated hole 34 is Formed which is extended in the axial direction between the penetrating holes 25a and 25b of the smaller-diameter axle portion 21 of the upper half piston body 12, as shown in FIGS. 5A and 5B.

Figure 7:
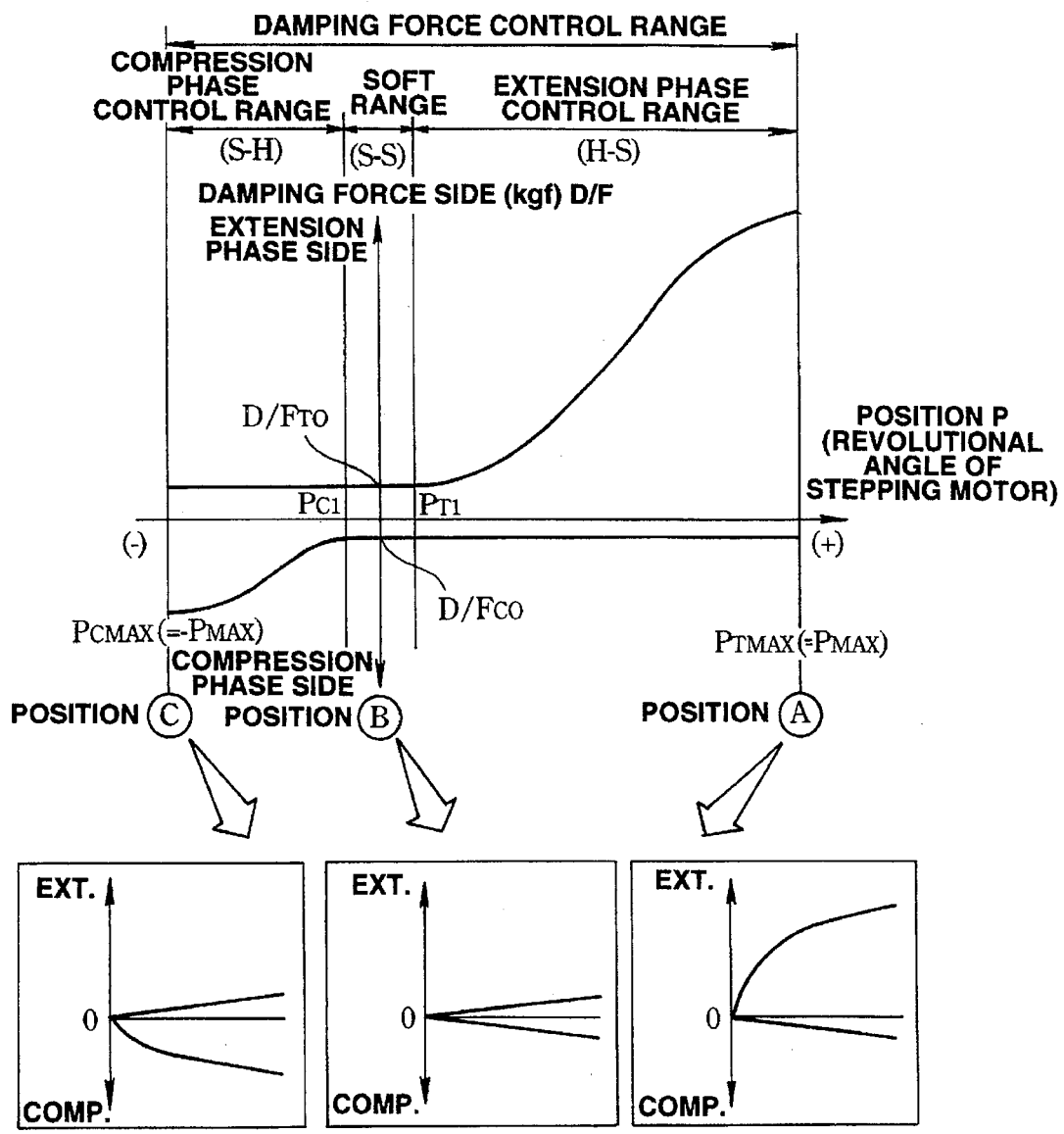
FIG. 7 is an explanatory view indicating a damping force characteristic of the shock absorber shown in FIGS. 1 through 3 with respect to a position of a valve body thereof.

The positional relationship between the penetrating hole 82, the communication groove 33, and the elongated hole 84 is selected such that the damping force characteristic of each corresponding one of the shock absorbers 8FR through 8RR with respect to a revolution angle of the valve body 31 shown in FIG. 7, namely, the stepped (revolution) angle of the stepping motor 41FL through 41RR is achieved.

In details, for example, when the valve body is revolved to a position of A shown in FIG. 7, which gives a maximum revolution angle in a clockwise direction to the valve body 31, only the penetrating hole 82 is communicated with the arc-shaped groove 26, as shown in FIG. 3. Hence, for a compression phase movement in which the piston assembly 8 is moved downward, two working fluid passages C1 and C2 denoted by broken lines of FIG. 3 are formed, one of the working fluid passage C1 being a passage routing from the lower pressure chamber 9L to the upper pressure chamber 9U via the compression phase working fluid passage 14 (14a and 14b) and an orifice formed by the opening end of the compression phase working fluid passage 14 and by the compression phase disk valve 19 and the other working fluid passage C2 being a passage routing from the lower pressure chamber 31, 9L via an inner peripheral surface of the valve body the penetrating hole 32, the arc-shaped groove 26, and the compression phase working fluid passage 27, and via an orifice formed by the opening end of the compression phase working fluid passage 27 and by the compression phase disk valve 28.

On the other hand, for an extension phase movement of the piston assembly 8 which moves upward (as viewed from FIG. 3), only one extension phase working fluid passage T1 denoted by a broken line of FIG. 3 is formed, the extension phase working fluid passage T1 being a passage routing from the upper pressure chamber 9U via the elongated groove 16 and extension phase flow passage 13 and via an orifice formed by the opening end of the extension phase flow passage 13 and the extension phase flow passage 18 to the lower pressure chamber 9L. Therefore, for the extension phase, the relatively large damping force is emanated which is abruptly increased as a speed of the piston assembly 8 is increased and for the compression phase, the relatively small damping force is emanated which is slightly increased as the speed of the piston assembly 8 is increased.

Next, when the valve body 31 is revolved in a counterclockwise direction from the position A shown in FIG. 7, the communication groove 33 of the valve body 31 is communicated with the penetrating holes 24a and 25a of the smaller-diameter axle portion 21 so that opening areas of the communication groove 33 to the penetrating holes 24a and 25a are gradually increased. Therefore, for the extension phase movement of the piston 8, as shown in FIG. 4A, a new working fluid passage T2 is formed which is parallel to the above-described working fluid passage T1 and is a passage routing from the elongated groove 16, circular ring-shaped groove 16, the circular ring-shaped groove 15U, the penetrating hole 24a, the communication groove 33, the penetrating hole 24b, the circular ring-shaped groove 15L, and elongated groove 17, and the orifice formed by the elongated groove 17 and compression phase disk valve 18 toward the lower pressure chamber 9L. Thus, the maximum value of the damping force is, as shown in FIG. 7, gradually decreased as the opening areas between the communication groove 33 and the penetrating holes 24a and 24b of the smaller-diameter axle portion 21 are increased. For the extension phase movement of the piston assembly 8, a minimum damping force state is maintained so as to maintain the formations of the working fluid passages C1 and C2, as shown in FIG. 4B. As shown in FIGS. 4A and 4B, such a position as described above is a position A' between the position A and position B as will be described below.

Furthermore, when the valve body 31 is revolved in the counterclockwise direction to be reached in the proximity to a position of B shown in FIG. 7, the penetrating hole 24b and the penetrating hole 25b of the valve body 31 are communicated together via the elongated hole 34. Therefore, for the extension phase movement of the piston 8, as shown in FIG. 5B, the working fluid T3 is formed which is parallel to the flow passages T1 and T2, directing from the elongated groove 16, circular ring-shaped groove 15U, the penetrating hole 24b, the elongated hole 34, and the hole 23a toward the lower pressure chamber 9L. As the extension phase damping force is in the minimum damping force exerting state. For the compression phase movement of the piston 8, new working fluid flow passages C3 and C4 are formed in addition to the above-described working fluid flow passages of C1 and C2, the working fluid flow passage C3 routing from the hole 23a, the elongated hole 34, the penetrating hole 25a, and circular ring-shaped groove 15U and the working fluid flow passage C4 being a passage routing from the hole 23a, the elongated hole 34, the penetrating hole 25b, the circular ring-shaped groove 15L, the penetrating hole 24b, the communication groove 33, the penetration hole 24a, and the circular ring-shaped groove 15U to reach to the elongated groove 16.

As shown in FIG. 7, the minimum damping force exerting state is maintained.

Furthermore, when the valve body 31 is further revolved in the counterclockwise direction from the position B of FIG. 7, the opening areas between the elongated hole 34 and both of the penetrating holes 24b and 25b are reduced so that at the time of revolution angle of $\theta_{B2}$, the passage between the penetrating holes 24b and 25b and the elongated hole 34 is interrupted as shown in FIG. 6B but the opening area between the penetrating hole 32 and arc-shaped groove 26 is gradually reduced when the revolution angle of the valve body 31 falls in a range from $\theta_{B2}$ to the maximum revolution angle of $\theta_C$ in the counterclockwise direction, the working fluid flow passages T1 and T2 are present together for the extension phase movement of the piston 8 so that the minimum damping force exerting state is maintained. On the contrary, for the compression phase movement of the piston assembly 8, the opening area between the penetrating hole 32 and arc-shaped groove 26 is gradually decreased so that the maximum damping force is gradually increased. When the revolved position of the valve body 31 is reached to a position of C shown in FIG. 7, the passage between the penetrating hole 32 and the arc-shaped groove 26 is interrupted. For the compression phase movement of the piston assembly 8, the flow passage formed from the lower pressure chamber 9L to the upper pressure chamber 9U is only the flow passage C1, thus the shock absorber providing the compression phase large damping force exerting state.

That is to say, since the above-described damping forces are set according to the respective opening areas of respective orifices formed between the valve body 31 and piston 8, the revolution angle of the stepping motor which causes the valve body 31 to relatively rotate with respect to the piston assembly 8 is a fluid stream resistance determined according to the throttling magnitude of the respective orifices, namely, a controlled variable for the damping coefficient to be selectively set and each damping force is expressed in the form of the damping force coefficient multiplied by the piston speed.

Hence, suppose that the revolution angle of the stepping motor is a position P. The position P which provides the maximum damping force for the extension phase damping force is the extension phase maximum position $P_{TMAX}$. The position P which provides the maximum damping force for the compression phase damping force is the compression phase maximum position $P_{CMAX}$. However, for a convenience purpose, suppose that the position P which corresponds to an intermediate value in a range set at the low damping force in which both extension and compression phase damping forces are set to the low damping force is "0". The position change toward which the extension phase damping force becomes higher is supposed to be positive and the position change toward which the compression phase damping force becomes higher is supposed to be negative. In this case, the extension phase maximum position $P_{TMAX}$ is simply expressed as $P_{MAX}$ with the plus sign and the compression phase maximum position $P_{CAMX}$ is simply expressed as $(-P_{MAX})$ with the minus sign. It is, however, noted that absolute values of $|P_{MAX}|$ of the respective maximum positions ($P_{TMAX}$ and $P_{CMAX}$) are not always the same. A range from a positive threshold value $P_{T1}$ to a negative threshold value $P_{C1}$ crossing the position of "0" from among a whole damping force control range from the negative value of the compression phase maximum position ($-P_{MAX}$) to the positive value of the extension phase maximum position $P_{MAX}$ gives the extension phase low damping force $D/F_{T0}$ and the compression phase low damping force $D/F_{C0}$ so as to form a soft range in which a smoothness of the low velocity running condition of the vehicle is achieved according to the arithmetic logical operations of the controller 4 as will be described later, this soft range being simply referred to as S—S range. A range in which the position of P is positively large, namely, a range in which the position P ranges from the positive threshold value $P_{T1}$ to the positive extension phase maximum position $P_{MAX}$ gives an extension phase control range in which the extension phase damping force is set higher (larger) (hereinafter referred simply to as H–S range).

A range beginning from a negative threshold value $P_{C1}$ of the S—S range to the negative compression phase maximum position ($-P_{MAX}$) in which the position P is negatively large is a compression phase control range in which the compression phase damping force is set higher (larger) (hereinafter, referred to as S–H range). Hence, the positive threshold value $P_{T1}$ is represented by the positive low damping threshold value and the negative threshold value $P_{C1}$ is represented by the negative low damping force threshold value.

On the other hand, a piston rod 35 in the cylindrical shape is received by the hole 23c of the upper half piston body 12, an upper end of the piston rod 35 being projected upward from the cylindrical tubes 7, as shown in FIG. 2, its upper end of the piston rod 35 being projected upward from the cylindrical tubes 7 and being fixed to a bracket 37 attached to a vehicular body (sprung mass) member 36 by means of a nut 39 via a rubber bushings 38U and 38L. A revolving axle 41a of a corresponding one of the stepping motors 41FL through 41RR is projected downward and fixed to the upper end of the piston rod 35 so that both of the rotating axle 41a and the valve body 31 as will be described later are linked by means of a connecting rod 42 loosely inserted into the valve body 31 and piston rod 35. It is noted that numeral 43 denotes a bumper rubber. A lower end of the cylindrical tube 7 is linked to a road wheel member (not shown) (unsprung mass member).

Figure 8:
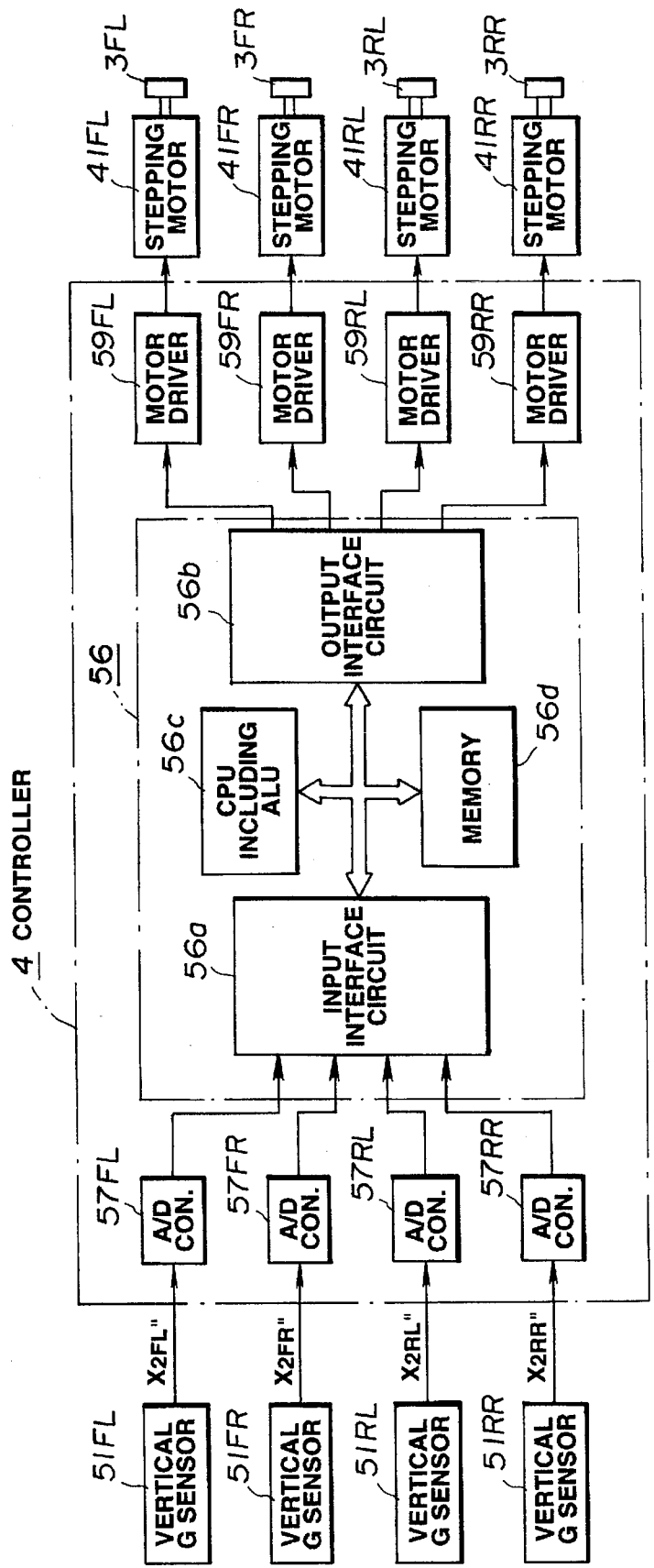
FIG. 8 is a partially cross-sectioned front view of a damping force adjusting mechanism of the representative shock absorber adopted in the embodiment shown in FIGS. 1 and 2 in which a maximum damping force is exhibited during a rise (upward motion) of a vehicle body.

Next, as shown in FIG. 8, the controller 4 is connected to four sprung mass vertical acceleration sensors 51FL, 51FR, 51RL, and 51RR as vertical acceleration (G) sensors installed on parts of the vehicle body corresponding to the respective road wheel arranged positions, each vertical acceleration sensor producing and outputting vertical acceleration detection (indicative) values $X_{2FL}$ through $X_{2RR}$ of analog voltages. The analog values of the output sprung mass vertical acceleration indicative signals are positive when the vehicle body goes upward and are negative when the vehicle body goes downward. The stepping motors 41FL through 41RR are connected to the controller 4 at its output side so as to control the damping forces of the respective damping force variable shock absorbers 3FL through 3RR (in the exact term, the damping force coefficients).

The controller 4 includes a microcomputer 56 having: an input interface circuit 56a; an output interface circuit 56b; arithmetic operation logical unit (or CPU (central Processing Unit or microprocessor, and hereinafter referred to as the CPU); and memory unit 56d, four A/D (Analog to Digital) converters 57FL through 57RR supplying the sprung mass vertical acceleration values $X_{2FL}$ and $X_{2RR}$ from the sprung mass vertical acceleration sensors 51FL through 51RR into the digital values so that the output digital values are supplied to the input interface circuit 56a; and motor drive circuits 59RL through 59RR which drive the respectively corresponding stepping motors 41FL through 41RR receiving stepping control signals from the output interface circuit 56b for the respective stepping motors 41FL through 41RR and outputting the converted stepping pulses to the respectively corresponding stepping motors 41FL through 41RR. It is noted that each motor drive circuit 59FR through 59RR revolves the valve body 31 of the corresponding one of the respectively mechanically connected shock absorbers 41FR through 41RR.

The CPU 56c of the microcomputer 56 integrates the respectively input vehicle body vertical acceleration detected values $X_{2FL}$ through $X_{2RR}$ through a predetermined series of processing to calculate $X_{2FL}$ through $X_{2RR}$ (hereinafter, referred to as sprung mass vertical velocities). Then, the CPU 56c calculates a target revolution angle of each stepping motor 41FL through 41RR which determines the damping force coefficient of the corresponding one of the shock absorbers 3FL through 3RR, namely, the target position Pn of the valve body 81 in order to achieve the damping forces D/F in accordance with the respective sprung mass vertical velocities $X_{2FL}'$ through $X_{2RR}'$ which are the respective sprung mass vertical velocities $X_{2FL}'$ through $X_{2RR}'$ excepting a dead zone range between the dead zone threshold values ($-X_{2io}'$) through $X_{2io}'$ (i=FL, FR, RL, or RR) set in the vicinity to zero values of the respective sprung mass vertical velocities $X_{2FL}'$ through $X_{2RR}'$.

On the other hand, when each one of the respective sprung mass vertical velocities $X_{2FL}'$ through $X_{2RR}'$ is equal to or above a positive preset upper limit threshold value related to the sprung mass vertical velocity or equal to or negatively below a negative preset lower limit threshold value ($-X_{2i1}'$), the CPU 56c sets the respective dead zone threshold values ($-X_{2io}$)' and $X_{2in}'$ to smaller values by a predetermined quantity (herein, $|\pm X_{2RR}'|$ in terms of their absolute values while each one of the sprung mass vertical velocities $X_{2FL}'$ through $X_{2RR}'$ crosses a zero point (the value is intersected across the zero point and goes positive or goes negative) by numbers of times, i.e., predetermined count values $CNT_0$. The CPU 56c calculates the target position $P_D$ of the valve body 31 of each shock absorber 8FL through 3RR in accordance with each sprung mass vertical velocity $X_{2FL}'$ through $X_{2RR}'$ excepting the dead zone narrowed by the settings of the above-described absolute values of the two upper and lower threshold values and calculates a difference value between each of the target positions $P_D$ and the present positions $P_A$ so that the CPU 56c outputs the stepped controlled variable according to the difference value to each corresponding one of the motor drive circuits 59FL through 59RR, respectively. The revolution angle of the stepping motor 41FL through 41RR, namely, the damping forces (=damping coefficients) of the respective shock absorbers 3FL through 3RR are controlled in an open loop control mode.

The memory unit 56d previously stores programs required for the arithmetic operation processing for the arithmetic operation processing unit 86c and sequentially stores data and arithmetically operated results required in the arithmetic processing procedures.

It is noted that the memory unit 56d generally includes a RAM (Random Access Memory) and a ROM (Read Only Memory).

Next, a basic principle of operation on the damping force controls of the respective damping force variable shock absorbers 3FL through 3RR to be executed in the embodiment will be described below.

Figure 9:
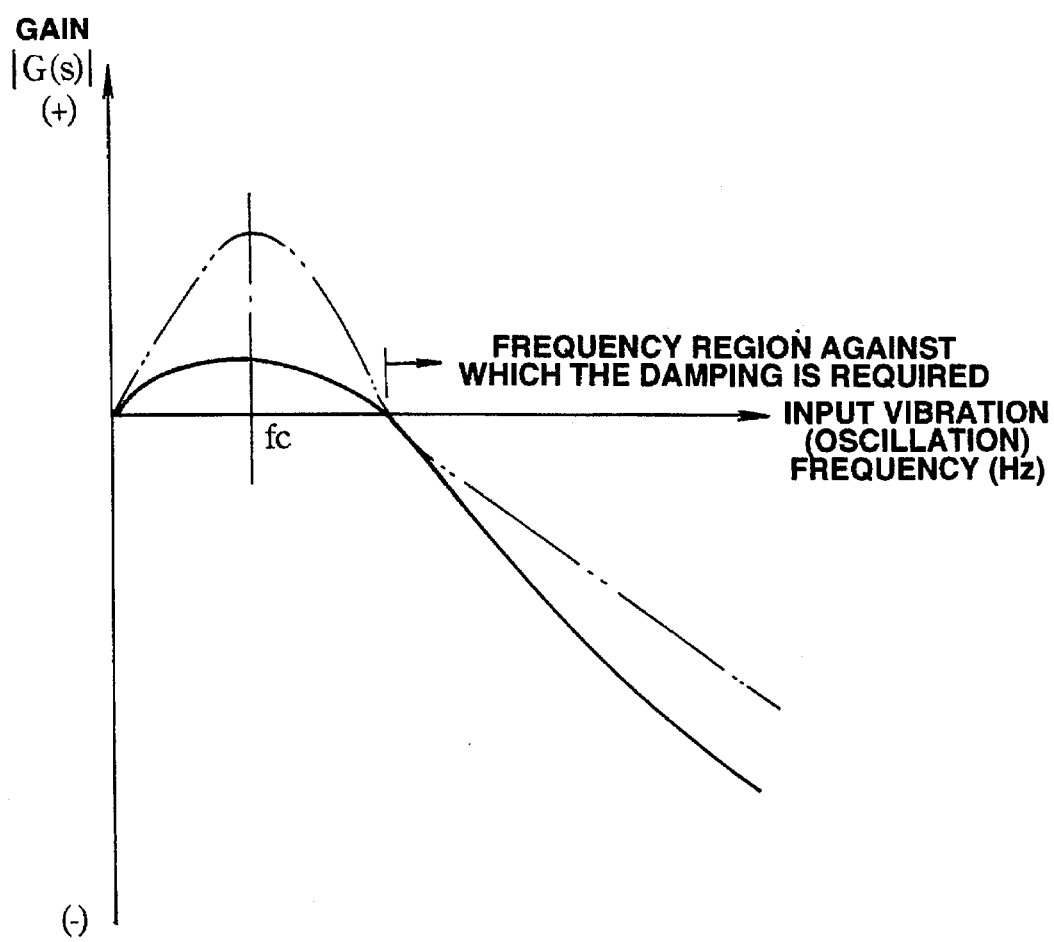
FIG. 9 is a characteristic graph representing a gain characteristic of a vibration input and output achieved by the damping force variable shock absorber.

First, when the damping force variable shock absorbers having the damping force characteristics shown in FIG. 9 are used, a gain characteristic of an output of the vehicle body actually oscillated with respect to the oscillation inputs to be acted upon the vehicle body appears as shown in FIG. 9. It is noted that a lateral axis denotes the input vibration frequency (Hz), that is to say, a frequency of the representative sprung mass vertical velocity.

From among the vibration (oscillation) inputs on the vehicle body, a relatively fast and large vehicle body oscillation, that is to say, upward and downward oscillations on the sprung mass in the middle and high frequency bands are desired to be actively damped since they give harmful riding comforts. On the other hand, since such vehicular body oscillations having relatively slow and small vehicular body oscillations, namely, the sprung mass oscillations in the low-frequency band give a vehicular occupant a weight sensation sensed as if he rode a massive vehicle, such vehicle body oscillations may be considered to be damped to a degree such that an unstable fluctuation does not occur.

Suppose that the oscillation input from a road surface, namely, the vertical oscillation of the unsprung mass in order to achieve the above-described damping principle. The vertical oscillation of the unsprung mass at a middle and/or high frequency band causes the damping force coefficient in the corresponding one of the shock absorbers 3FL through 3RR to be reduced and, on the other hand, the vertical oscillation of the unsprung mass at the low frequency band has generally its gradient expressed as the vertical velocity of the unsprung mass is small so that the damping coefficient of the shock absorber is enlarged, thus the damping force appearing as a product of both of the vertical velocity and damping force coefficient being enlarged. Consequently, an assured damping for the vertical oscillation of the sprung mass due to the occurrence in the road surface input is desired. In an input/output system for the vehicular body oscillation in which a control system using the damping force variable shock absorber is interposed, a vehicle body (sprung mass) resonance frequency is set in the low frequency band of the sprung mass vertical velocity and a gain of the sprung mass resonance frequency is reduced from such a state as denoted by a phantom line of FIG. 9 to a state denoted by a solid line of FIG. 9. Therefore, the gain for the sprung mass vertical velocity at the middle and/or high frequency band which is to actively be damped is furthermore reduced (its absolute value is increased) in the negative direction so that the riding comfort is enhanced, the weight sensation to the sprung mass vertical velocity at the low frequency band is changed from the unstable oscillation to the solid stable oscillation. In order to achieve this with the damping force exerted by each of the shock absorbers 3FL through 3RR, namely, the damping force coefficient characteristic, a sufficiently large (high) damping force coefficient with respect to the unsprung mass oscillation input at the low frequency band as described above is settable and. furthermore, it is important that a sufficiently small (low) damping force coefficient needs to be enabled to be set with respect to the unsprung mass oscillation input at the middle and/or high frequency band.

Figure 10:
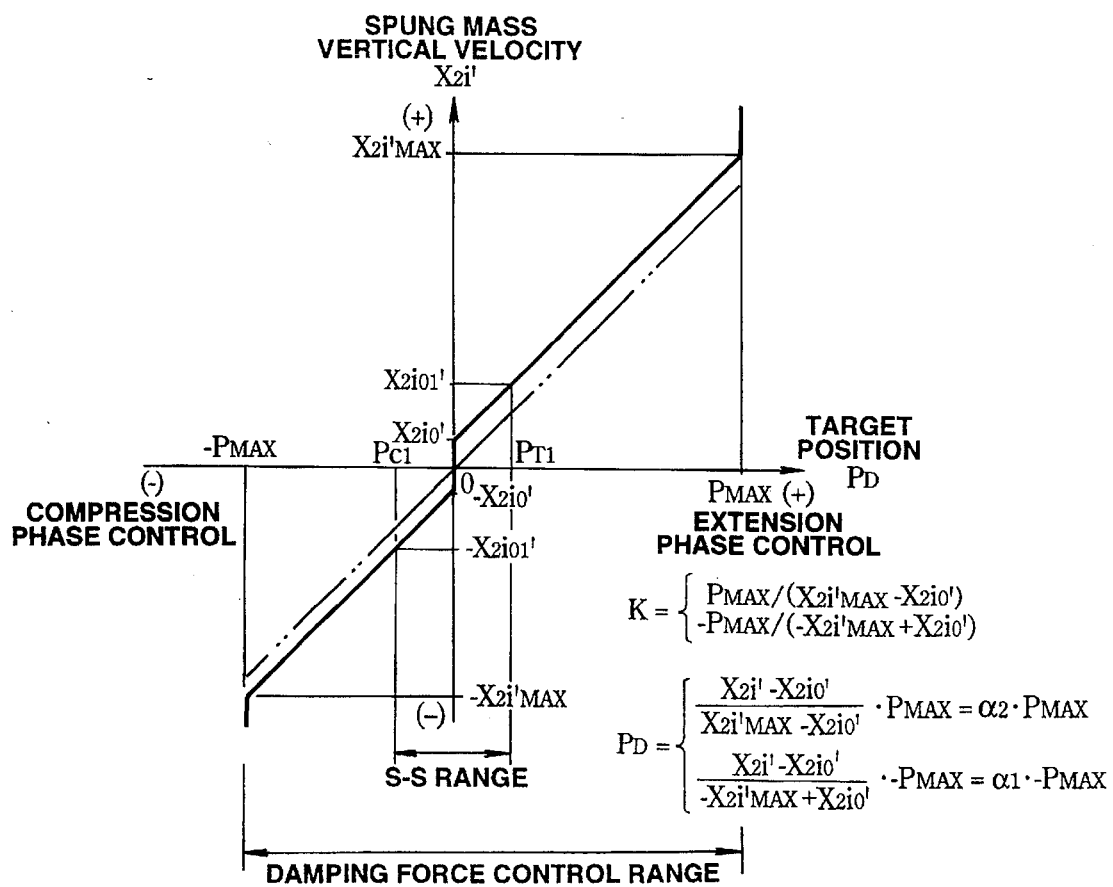
FIG. 10 is a characteristic graph representing a position of the valve body of the representative shock absorber with respect to a sprung mass vertical velocity.

In order to achieve the above-described Karnopp rule in brief in the vehicle body oscillation input/output system thus set or its control system, the target position $P_D$ may linearly be set, for example, with a proportional constant K with respect to the vehicle body oscillation input, namely, the sprung mass vertical velocity $X_{2i}'$ (i=FL, FR, RL, or RR), as denoted by a phantom line of FIG. 10. However, in a case where a minute oscillation input occurs which would be generated during the vehicle running condition under which the vehicle runs on a favorable flat road surface, namely, under which it is not necessary to variably control the damping force exerted in each shock absorber, it causes a wasteful consumption of energy that each stepping motor is revolved. namely, the stopped position of the valve body is changed, even if the minute oscillation input causes no substantial change of the damping force within the soft range (S—S range). In addition, the revolutions of the stepping motors involve noise problems.

Hence, the dead zone for the oscillation input, i.e., the sprung mass vertical velocity $X_{2i}'$ is set, the dead zone being defined as a range from the positive dead zone threshold value $X_{2i0}'$ to the negative dead zone threshold value $(-X_{2i0}')$. If the sprung mass vertical velocity $X_{2i0}'$ falls within the dead zone range, the target position $P_D$ is set to "0". If the sprung mass vertical velocity $X_{2i}'$ does not fall in the dead zone range, the target position $P_D$ is linearly increased with the proportional constant K along with the increase in the sprung mass vertical velocity $X_{2i}'$.

Suppose herein that the sprung mass vertical velocity-versus-target position correlation characteristic shown in FIG. 10 is a control map.

At this time, suppose that the sprung mass vertical velocity $X_{2i}'$ corresponding to the target position $P_D$ is the extension phase maximum sprung mass vertical velocity $X_{2i\,MAX}'$. Hence, when the sprung mass vertical velocity $X_{2i}'$ falls in a range equal to or above the extension phase maximum sprung mass vertical velocity $P_{2i'MAX}$, the target position $P_D$ is fixed to the extension phase maximum position $P_{MAX}$. On the other hand, when the target position $P_D$ gives the compression phase maximum position $(-P_{MAX})$, the sprung mass vertical velocity $X_{2i}'$ corresponding to the target position $P_D$ is supposed to be the compression phase maximum sprung mass vertical velocity $(-X_{2i\,MAX})$. At this time, when the sprung mass vertical velocity $X_{2i}'$ is fixed to the compression phase maximum position $(-P_{MAX})$ when the sprung mass vertical velocity $X_{2i}'$ falls in a range equal to or negatively smaller (its absolute value is larger).

Furthermore, suppose that the sprung mass vertical velocity $X_{2i}'$ when the target position $P_D$ gives the positive low damping threshold value $P_{T1}$ is a positive low damping sprung mass vertical velocity threshold value $X_{2i01}'$ and the sprung mass vertical velocity $X_{2i}'$ when the target position $P_D$ gives the negative low damping threshold value $P_{C1}$ is supposed to be a negative low damping sprung mass vertical velocity threshold value $(-X_{2i01}')$.

As described above, the gradient K of the characteristic graph target position $P_D$ with respect to the sprung mass vertical velocity $X_{2i}'$ in the range from the positive dead zone threshold value $X_{2i0}'$ to the extension phase maximum sprung mass vertical velocity $X_{2i'MAX}$ is expressed in the following equation (1). The target position $P_D$ in this case is expressed using the extension phase target position proportional constant $\alpha_2$ in the following equation (2).

$$K = P_{MAX}/(X_{2i'MAX} - X_{2i0}'). \tag{1}$$

$$P_D = \alpha_2 \cdot P_{MAX} \tag{2}$$
$$= \{(X_{2i}' - X_{2i0}')/(X_{2i'MAX} - X_{2i0}')\} \cdot P_{MAX}.$$

On the other hand, the gradient K of the characteristic graph target position $P_D$ with respect to the sprung mass vertical velocity $X_{2i}'$ from the negative dead zone threshold value $(-X_{2i0}')$ to the compression phase maximum sprung mass vertical velocity $(-X_{2i'MAX})$ is expressed in the following equation (3). Then, the target position $P_D$ is expressed in the following equation (4) using the compression phase target position proportional constant (coefficient) $\alpha_1$.

$$K = (-P_{MAX})/\{(-X_{2i'MAX}) - (-X_{2i0'})\}. \quad (3)$$

$$P_D = \alpha_1 \cdot (-P_{MAX}) \quad (4)$$
$$= [\{(X_{2i'} - (-X_{2i0'})\}/\{-X_{2i'MAX} - (-X_{2i0'})\}] \cdot (-P_{MAX}).$$

Figures 11A, 11B:
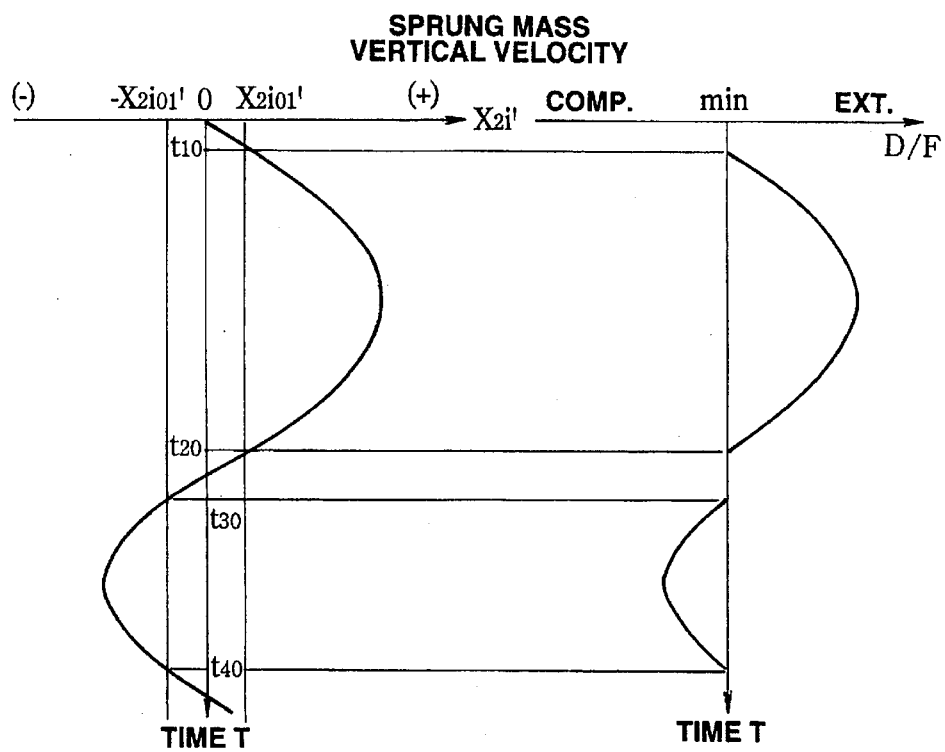
FIGS. 11A, 11B, and 11C are explanatory views for explaining basic damping effects according to the sprung mass vertical velocity-versus-damping force characteristic.
Figure 11C:
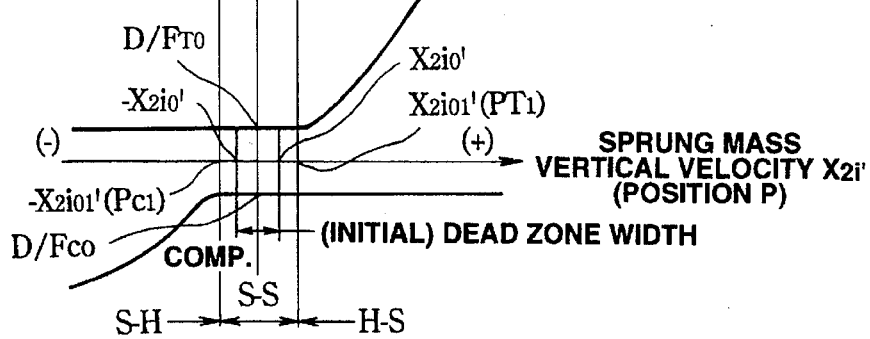

When the position P is linearly set for the sprung mass vertical velocity $X_{2i'}$ except the dead zone as described above, the damping force characteristic shown in FIG. 7 appears as shown in FIG. 11C with respect to the sprung mass vertical velocity $X_{2i'}$.

In other words, suppose that a reduction scale of the characteristic of the position-versus-damping force shown in FIG. 7 is the same as that of the characteristic of position-versus-damping shown in FIG. 11C. The soft range (S—S range) of the characteristic of the sprung mass vertical velocity to damping force shown in FIG. 11C is widened by the sprung mass vertical velocity dead zone in which the position P is maintained at "0". Both of the extension phase control range (H-S range) and the compression phase control range (S-H range) may be considered to be positioned outside the dead zone.

Explained herein is an operation of the apparatus for controlling the damping forces for the vehicular shock absorbers when the sprung mass vertical velocity $X_{2i'}$ shown in FIG. 11A is input as an impulsive oscillation input having the relatively low frequency and having the relatively large amplitude to the shock absorber having the characteristic of the sprung mass vertical velocity-versus-damping force shown in FIG. 11C.

First, as an initial stage of oscillation input, the sprung mass vertical velocity $X_{2i'}$ which is increased in the positive region exceeds the positive low damping sprung mass vertical velocity threshold value $X_{2i01'}$ at a time $t_{10}$ and, furthermore, is to be continued to be increased. However, since the increase rate (gradient of increasing slope) becomes gradually small due to the characteristic as the oscillation input and the action of an extension phase damping force increase action as will be described later, the sprung mass vertical velocity begins to be decreased in the positive region exceeding a local maximum point at a certain time and decreased below the positive low damping sprung mass vertical velocity threshold value $X_{2i01'}$ at a time $t_{20}$. During the time duration from the time $t_{10}$ to the time $t_{20}$, an absolute value of $|X_{2i'}|$ of the sprung mass vertical velocity when it passes the S—S range is small and the extension and compression phase damping coefficients set at the S—S range including the dead zone range are small, the damping force D/F achieved by the damping force variable shock absorber at the S—S range may be considered to be converged into the minimum damping force D/Fmin. Furthermore, suppose that the damping force D/F achieved by the damping force variable shock absorber has a linear relationship to the position P, namely, the sprung mass vertical velocity $X_{2i'}$ excepting the dead zone. At the time duration from the time $t_{10}$ to $t_{20}$, namely, at the time duration $t_{10}$ through $t_{20}$, especially, the extension phase damping force D/F which is synchronized with the increase/decrease in the sprung mass vertical velocity $X_{2i'}$ is generated as shown in FIG. 11B. In other words, the sprung mass vertical velocity $X_{2i'}$ is effectively attenuated (damped) according to the extension phase damping force D/F which is varied according to the variation in the sprung mass vertical velocity $X_{2i'}$ itself. This is acted upon as a force obstructing such a motion that the vehicle body is to be separated from each corresponding one of the vehicle road wheels. Consequently, the upward movement of the vehicle body can be reduced. Since, at this time, the compression phase damping force D/F is at the minimum as shown in FIG. 11C, an influence of the compression phase damping force D/F on the vehicle body is hardly given even if each corresponding one of the road (tire) wheels is moved upward due to a presence on convex and recess of the running road surface.

Next, the decreasing sprung mass vertical velocity $X_{2i'}$ begins to be decreased (its absolute value is increased) in the negative region and decreased below the negative low damping sprung mass vertical velocity threshold value $(-X_{2i01'})$ to further continue to be decreased. However, since the decreased rate (the gradient of its absolute value is increased) becomes gradually reduced due to the inherent characteristic of the vertical sprung mass velocity as the oscillation input and a compression phase damping force increase action as will be described later, thereafter, exceeds a local minimum point at a certain time. and, thereafter, begins to be increased in the positive direction and increased crossing the negative low damping sprung mass vertical velocity threshold value $(-X_{2i01'})$ at a time $t_{40}$. During another time duration from the time $t_{30}$ to the time $t_{40}$, especially, the compression phase damping force D/F which is synchronized with the variation in the sprung mass vertical velocity $X_{2i'}$ is generated as shown in FIG. 11B so that this sprung mass vertical velocity $X_{2i'}$ is effectively damped according to the damping force D/F which is varied according to its sprung mass vertical velocity. In other words. on the contrary of the separation of the vehicle body from the corresponding one of the road wheels, the damping force is generated only when the vehicle body is approached to the corresponding one of the road wheels so that the downward movement of the vehicle body can be reduced.

In addition, at this time duration, since the extension phase damping force D/F is at a minimum as shown in FIG. 11C, the influence of the sprung mass vertical velocity $X_{2i'}$ on the vehicle body is hardly given even if the corresponding road wheels moved downward due to the presence of convex and recess on the running road surface.

It is noted that the absolute value $|X_{2i'}|$ of the sprung mass vertical velocity at the local minimum is smaller than the absolute value $|X_{2i'}|$ of the sprung mass vertical velocity at the local maximum.

Since, when the relatively slow and large oscillation input occurs which causes the vehicle body to be oscillated alternatingly in the vertical direction, the increase and decrease of the sprung mass vertical velocity $X_{2i'}$ are repeated, its absolute value being gradually converged in the same way as the time duration after the time $t_{40}$ of FIG. 11A. While at least both of the local maximum point and local minimum point of the sprung mass vertical velocity $X_{2i'}$ are converged into the S—S range from the negative low damping sprung mass vertical velocity threshold value $(-X_{2i01'})$ to the positive low damping sprung mass vertical velocity threshold value $X_{2i01'}$, the damping force D/F exerted by each corresponding one of the shock absorbers 3FL through 3RR is variably controlled in accordance with the increase and decrease in the sprung mass vertical velocity $X_{2i'}$.

From among the history of the sprung mass vertical velocity, during the time durations from the time $t_0$ to the time $t_{10}$ appearing as shown in FIG. 11B and from the time $t_{20}$ to the time $t_{30}$ appearing as shown in FIG. 11B, with the time durations during which the damping force D/F achieved by the variable damping force shock absorber is maintained at the extension phase low damping force D/F$_{T0}$ or at the compression phase low damping force D/F$_{CO}$ shown in FIG. 11C taken into consideration, the damping force exerted by the corresponding one of the respective shock absorbers is maintained relatively at the low (soft or small) damping force for a relatively long period of time in the S—S range placed in the vicinity to zero point regardless of the sprung mass vertical velocity $X_{2i'}$ still crossing zero point in either of the positive or negative direction. Thus, the vehicle body oscillation, namely, the sprung mass vertical velocity $X_{2i'}$ is not effectively damped and converged so as to give the vehicular occupant the fluctuation sensation and so that the vehicular stability can be reduced.

To solve the above-described problem only, for example, with the above-described dead zone threshold value ($\pm X_{2i0'}$) preset to a smaller value so that the damping force D/F is set to the value as large as possible even when the sprung mass vertical velocity $X_{2i'}$ is small and the gain of the whole control system may further be enlarged. However, with the gain of the whole control system uniformly set to the larger value, the damping force emanated from each corresponding one of the shock absorbers is too hard for a small-amplitude and high-frequency sprung mass vertical velocity $X_{2i'}$. Especially, at the middle or high speed running condition, the enlarged damping force causes the vehicular occupant the rigidity sensation and the vehicular stability can be reduced in some sense of the word. In addition, since the large damping force is emanated for the slow and small sprung mass vertical velocity $X_{2i'}$, at least such a riding comfort as the weight sensation cannot be achieved any more. In addition, since each corresponding one of the stepping motors as the actuator is always continued to be driven, the above-described solution is not favorable in terms of the energy saving and whole noise evaluation.

Hence, in the embodiment, the width of the dead zone is narrowed so that a time duration during which the damping force is maintained at the low (small) damping force is shortened when such a large oscillating input that the vehicle body, namely, the sprung mass is oscillated repeating the oscillations from the extension phase to the compression phase and vice versa so that the oscillation of the sprung mass is damped and converged as early as possible. Specifically, when the sprung mass vertical velocity $X_{2i'}$ is increased equally to or above the sprung mass vertical velocity upper limit threshold value $X_{2i1'}$ or negatively decreased equally to or above the sprung mass vertical velocity lower limit threshold value ($-X_{2i1'}$), both of the above-described dead zone threshold values ($\pm X_{2i0'}$) are set to predetermined value $X_{2i00'}$ as "0"s. That is to say, its absolute value is reduced by $|X_{2i0'}|$ for the positive dead zone threshold value $X_{2i0'}$ and its absolute value is reduced by $|X_{2i0'}|$ for the negative dead zone threshold value ($-X_{2i0'}$). It is, however, noted that since the extension phase maximum position $P_{MAX}$ at the extension phase maximum sprung mass vertical velocity $X_{2i'MAX}$ and the compression phase maximum position ($-P_{MAX}$) at the compression phase maximum sprung mass vertical velocity ($-X_{2i'MAX}$) are not changed, the sprung mass vertical velocity—versus—target position characteristics shown in FIGS. 11A to 11C are changed from a phantom line of FIG. 12 to a solid line of FIG. 12.

When such a large oscillation input that the absolute value $|X_{2i'}|$ of the sprung mass vertical velocity is equal to or larger than the absolute value $|\pm X_{2i1'}|$ of the vertical sprung mass velocity upper and lower limit threshold values is detected, the positive and negative dead zone threshold values ($\pm X_{2i0'}$) are both zeros "0s" so that the gradient K of the characteristic curve of the target position $P_D$ with respect to the positive sprung mass vertical velocity $X_{2i'}$ from the value of "0" to the extension phase maximum sprung mass vertical velocity $X_{2i'MAX}$ is changed from the above-described equation (1) to the following equation (1)' and the target position $P_D$ at this time is changed from the above-described equation (2) to the equation (2)' using the extension phase target position proportional constant $\alpha_2$.

$$K = P_{MAX}/X_{2i'MAX} \tag{1}'$$

$$P_D = \alpha_2 \cdot P_{MAX} \tag{2}'$$
$$= \{(X_{2i'}/(X_{2i'MAX}) \cdot P_{MAX}.$$

In addition, the gradient K of the characteristic curve of the target position $P_D$ with respect to the negative sprung mass vertical velocity $X_{2i'}$ from the value of "0" to the compression phase maximum sprung mass vertical velocity ($-X_{2i'MAX}$) is changed from the equation (3) to the equation (3)' expressed below and the target position $P_D$ at this time is changed from the equation (4) to the equation (4)' using the compression phase target position proportional constant $\alpha_1$.

$$K = (-P_{MAX})/(-X_{2i'MAX}) . \tag{3}'$$

$$P_D = \alpha_1 \cdot (-P_{MAX}) \tag{4}'$$
$$= X_{2i'}/(-X_{2i'MAX}) \cdot (-P_{MAX}).$$

Figure 12:
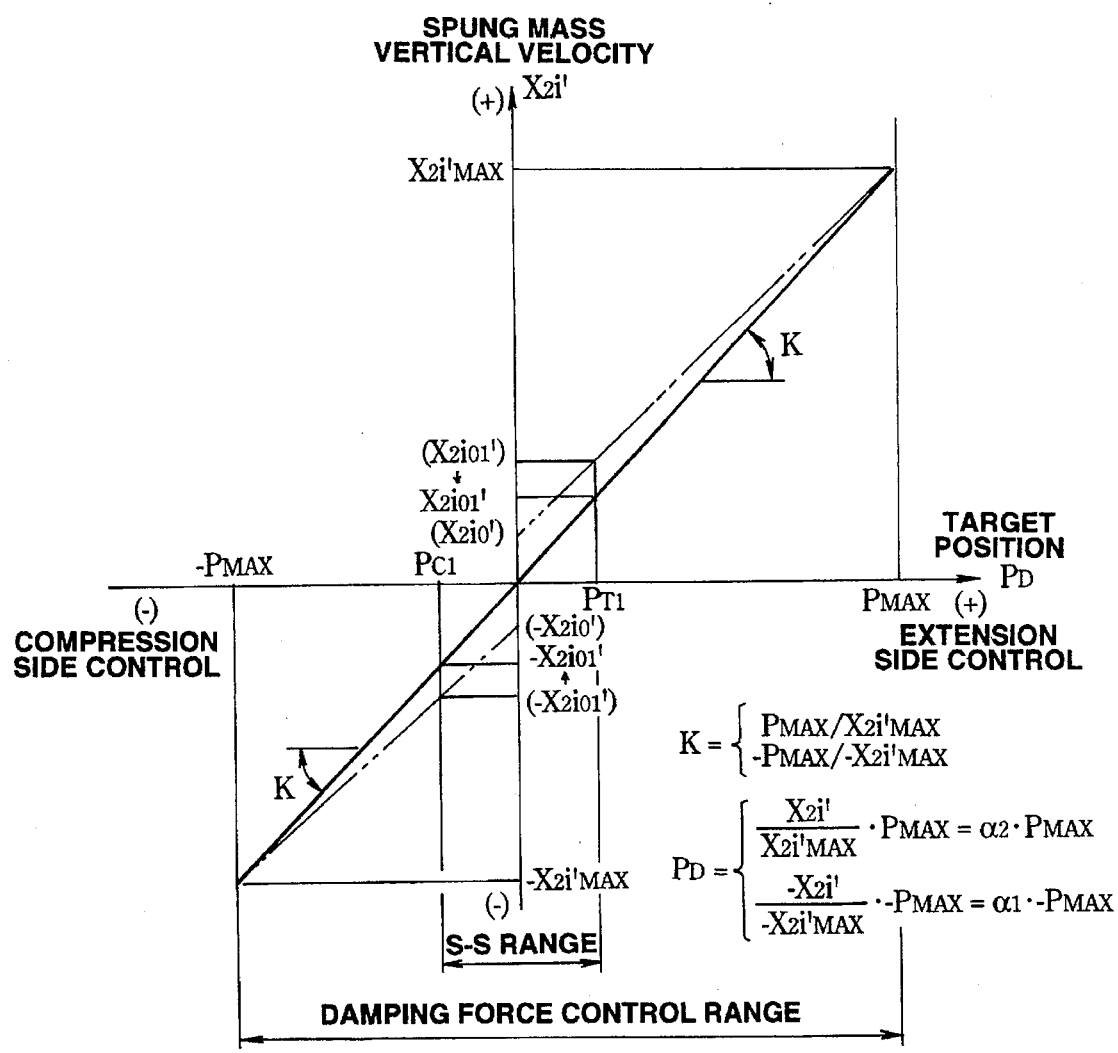
FIG. 12 is a characteristic graph of the position of the valve body of the representative shock absorber shown in FIGS. 1 and 2 with respect to the sprung mass vertical velocity.

In this way, when both of the positive and negative dead zone threshold values ($\pm X_{2i0'}$) are set to "0s" so that the substantial dead zone is eliminated and the control curve, namely, a cut piece and a gradient for the sprung mass vertical velocity $X_{2i'}$ to set the target position $P_D$ is changed from the phantom line to the solid line as shown in FIG. 12, the positive low damping sprung mass vertical velocity threshold value $X_{2i01}$, when the target position $P_D$ is set to the positive low damping threshold value $P_{T1}$, its absolute value of $P_{T1}$ is reduced by a degree corresponding to the change of the positive dead zone threshold value $P_D$ to "0" as shown in FIG. 12. The absolute value of the negative low damping sprung mass vertical velocity threshold value ($-X_{2i01'}$) when the target position $P_D$ gives the negative low damping threshold value PC1 is reduced by the degree corresponding to the change of the negative dead zone threshold value ($-X_{2i0'}$) to "0s", as shown in FIG. 12.

Figures 13A, 13B:
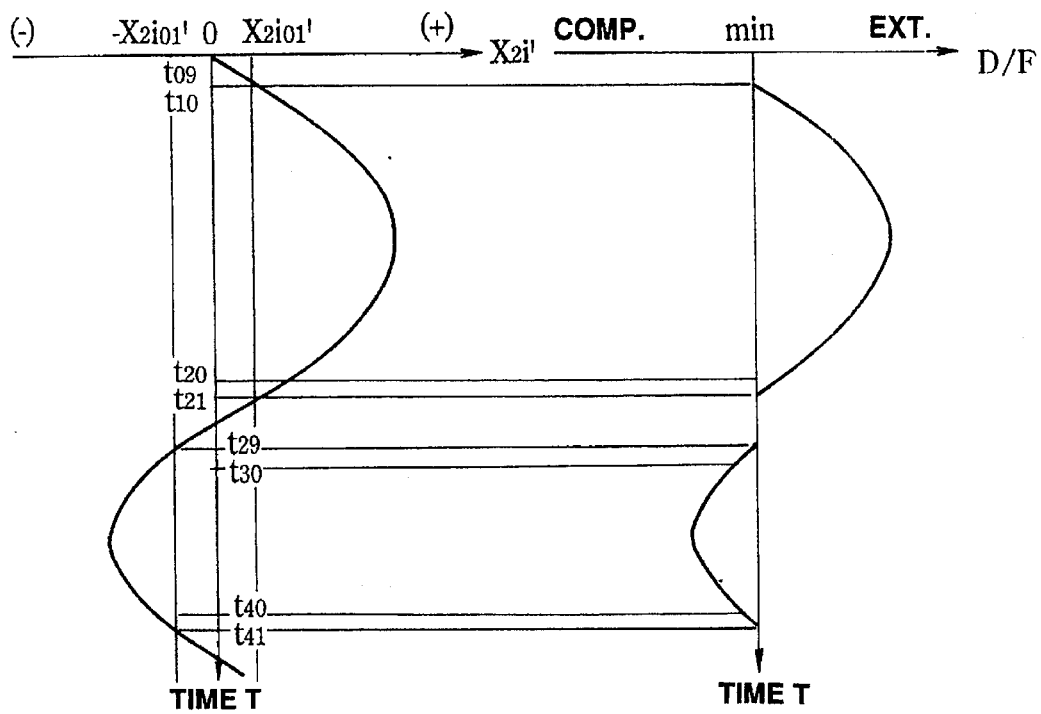
FIGS. 13A, 13B, and 13C are explanatory views for explaining the damping effects according to the sprung mass vertical velocity-versus-damping force characteristic along with the position setting of FIG. 12.
Figure 13C:
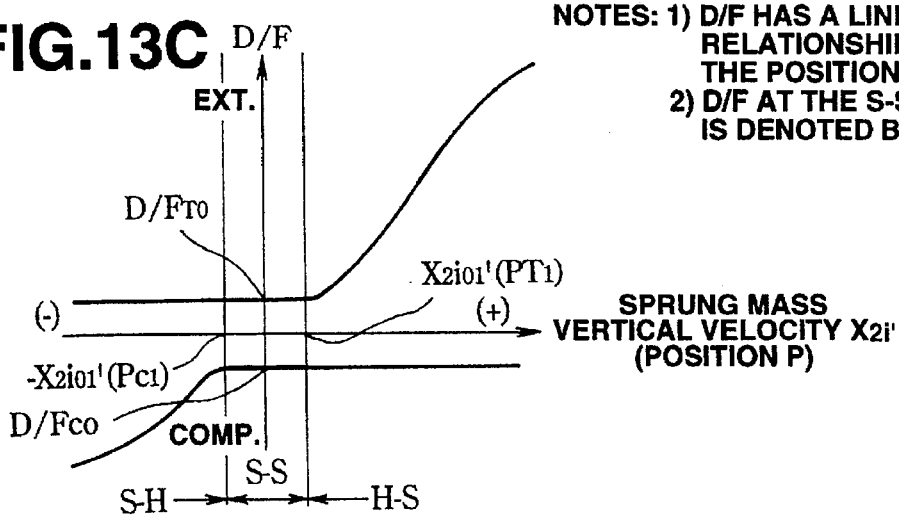

FIG. 13C shows the sprung mass vertical velocity—versus—damping force characteristic in the case of the elimination of the dead zone described above which is replaced from that shown in FIG. 11C.

In other words, it may be considered that the soft range (S—S range) which is the low damping force range positioned outside the dead zone is set aside zero point of the sprung mass vertical velocity $X_{2i'}$ due the elimination of the dead zone.

Suppose that the same sprung mass vertical velocity $X_{2i'}$ as shown in FIG. 11A is input in each corresponding one of the shock absorbers having the sprung mass vertical velocity-damping force characteristic.

As shown in FIG. 13A, the sprung mass vertical velocity $X_{2i'}$ which increases at the positive region as the initial stage of input thereof is increased and exceeds the positive low damping sprung mass vertical velocity $X_{2i'}$ at an earlier time $T_{09}$ that the time $t_{10}$ and further continued to be increased. However, the gradient of increase of the sprung mass vertical velocity becomes small so that the sprung mass vertical velocity $X_{2i'}$ begins to be decreased at the local maximum point at a certain time. At a time $t_{21}$ later than the time $t_{20}$, the sprung mass vertical velocity $X_{2i}$ is decreased and exceeds the positive low damping sprung mass vertical velocity threshold value $X_{2i01}$. On the other hand, the damping force D/F achieved by each corresponding damping force variable shock absorber at the S—S range in the same way as described above is converged to the minimum damping force D/Fmin Suppose furthermore that the damping force D/F achieved by the damping force variable shock absorber has a linear relationship to the position P, i.e., the sprung mass vertical velocity $X_{2i}$. During the time duration from the time $t_{09}$ which is earlier than the time $t_{10}$ to the time $t_{21}$ which is later than the time $t_{20}$, especially, the extension phase damping force D/F which is synchronized with the increase and decrease in the sprung mass vertical velocity $X_{2i}$ is emanated as shown in FIG. 13B. At this time, the sprung mass vertical velocity $X_{2i}$ is effectively damped according to the extension phase damping force D/F which is varied in accordance with the variation in the sprung mass vertical velocity $X_{2i}$ and the extension phase damping force D/F acts as a force obstructing such the motion that the vehicle body is tried to be separated from the corresponding one of the road wheels. Consequently, the upward movement of the vehicle body can be reduced. At this time, since the compression phase damping force D/F is minimum as shown in FIG. 13C. The compression phase minimum damping force D/F gives hardly influence on the vehicle body even though the corresponding one of the road wheels is caused to be moved upward due to the presence of convex and recess of the running road surface.

The further decrease continuing sprung mass vertical velocity $X_{2i}$ is soon begun to be decreased (its absolute value is continued to be increased at the negative region and exceeds the negative low damping sprung mass vertical velocity threshold value $(-X_{2i01})$ at a time $t_{29}$ which is earlier than the time $t_{30}$. Thereafter, the sprung mass vertical velocity $X_{2i}$ is continued to be decreased and the gradient of the decrease becomes smaller. After the sprung mass vertical velocity $X_{2i}$ passes the local minimum point, the sprung mass vertical velocity $X_{2i}$ is increased toward the positive region and exceeds the negative low damping sprung mass vertical velocity threshold value $(-X_{2i01})$ at a time $t_{41}$ which is later than the time $t_{40}$. During the time duration from the time $t_{29}$ which is earlier than the time $t_{30}$ to the time $t_{41}$ which is later than the time $t_{40}$, the compression phase damping force D/F is emanated as shown in FIG. 13B which is synchronized with the variation in the sprung mass vertical velocity $X_{2i}$. Hence, the sprung mass vertical velocity $X_{2i}$ is effectively damped which is varied according to the variation of the sprung mass vertical velocity itself $X_{2i}$. Therefore, on the contrary of the separation of the vehicle body from the corresponding one of the road wheels, the damping force is generated only when both of the vehicle body and corresponding one of the road wheels are approached together so that the downward movement of the vehicle body can be reduced. At this time, since the extension phase damping force D/F is the minimum as shown in FIG. 13C, the sprung mass vertical velocity at this time gives hardly influence on the vehicle body even if the corresponding one of the road wheels is caused to be moved downward due to the presence of the convex and recess. It is noted that the absolute value $|X_{2i}|$ of the sprung mass vertical velocity at the local minimum point is smaller than the absolute value of the sprung mass vertical velocity $X_{2i}$ at the local maximum point.

Since such a relatively slow and large oscillating input causes the vehicle body to be oscillated in the upward and downward directions alternatingly, the increase and decrease in the sprung mass vertical velocity $X_{2i}$ are repeated with its absolute value being gradually converged in the same way as described above at a time (not shown in FIG. 13A) after the time $t_{41}$. While at least both of the local maximum and local minimum points of the sprung mass vertical velocity $X_{2i}$ are converged into the S—S range from the negative low damping sprung mass vertical velocity threshold value $(-X_{2i01})$ to the positive low damping sprung mass vertical velocity threshold value $(X_{2i01})$, the damping force D/F emanated in the corresponding one of the shock absorbers is variably controlled.

The time duration during which, in each corresponding one of the damping force variable shock absorbers. the damping force D/F is maintained at the extension phase low damping force D/F$_{T0}$ or the compression phase low damping force D/F$_{C0}$ shown in FIG. 13C such as the time duration from the time $t_0$ to the time $t_{09}$ and the time duration from the time $t_{21}$ to the time $t_{29}$ is apparently shorter than the time duration from the time $t_0$ to the time $t_{10}$ shown in FIG. 11B and than the time duration from the time $t_{20}$ to the time $t_{29}$. In addition, the time duration during which the effective damping force according to the magnitude and direction of the sprung mass vertical velocity $X_{2i}$ is variably and relatively controlled such as the time duration from the time $t_{09}$ to the time $t_{21}$ and the time duration from the time $t_{29}$ to the time $t_{41}$ shown in FIG. 13B becomes apparently longer. Hence, for the sprung mass vertical velocity $X_{2i}$ which is increased and decreased still crossing the zero point in the positive and negative directions. the effective damping force emanating time duration according to the large oscillating inputs, the emanating time duration of the damping force by means of the corresponding one of the shock absorbers becomes long. Actually, since the vehicle body oscillation, i.e., the sprung mass vertical velocity $X_{2i}$ is effectively and speedily attenuated and converged, it gives the vehicular occupant a stable sensation.

The problem is until what time the control such that the width of the dead zone is narrowed is continued and when the narrowed dead zone is returned to the original width. As far as an expectation of accurate control is concerned, a state in which the vehicular body oscillating output, i.e., the sprung mass vertical velocity $X_{2i}$ is converged is monitored. When the sprung mass vertical velocity indicates a sufficient converging behavior, it is necessary to return the narrowed dead zone to the original width. To achieve this, it is essential to set the positive and negative sprung mass vertical velocity upper and lower limit threshold values $(\pm X_{2i1})$ also according to the gradient of the sprung mass vertical velocities $X_{2i}$, namely, the sprung mass vertical acceleration $X_{2i''}$. For example, as an absolute value of the sprung mass vertical acceleration $X_{2i''}$ becomes large and as the absolute value of the sprung mass vertical velocity $X_{2i}$ becomes large, it is thus necessary to set the absolute value of the positive and negative sprung mass vertical velocity upper and lower limit threshold values $(\pm X_{2i1})$. If such a calculation processing program as described above is set, its load of calculations provides considerably large burden.

Hence, in the embodiment, in order to relieve such calculation loads as described above, with the positive and negative sprung mass vertical velocity upper and lower limit threshold values $(\pm X_{2i1})$ set as predetermined values, in a case where such an input that the sprung mass vertical velocity $X_{2i}$ exceeding the positive and negative sprung mass vertical velocity upper and lower limit threshold values $(\pm X_{2i1})$ occurs as the oscillating input from the unsprung mass member, a number of times normally supposed the oscillating input oscillates the sprung mass alternatingly in the upward and downward directions is set, a predetermined zero crossing count value $CNT_0$ at which the sprung mass vertical velocity crosses zero point is set according to the above-described number of times, and the zero crossing is counted by a counter CNT from the time at which the control is transferred to that in which the dead zone is narrowed. Then, at a time point at which the counter CNT counts up the zero crossing count value $CNT_0$, the narrowed dead zone is returned to the original dead zone width.

Figure 14A:
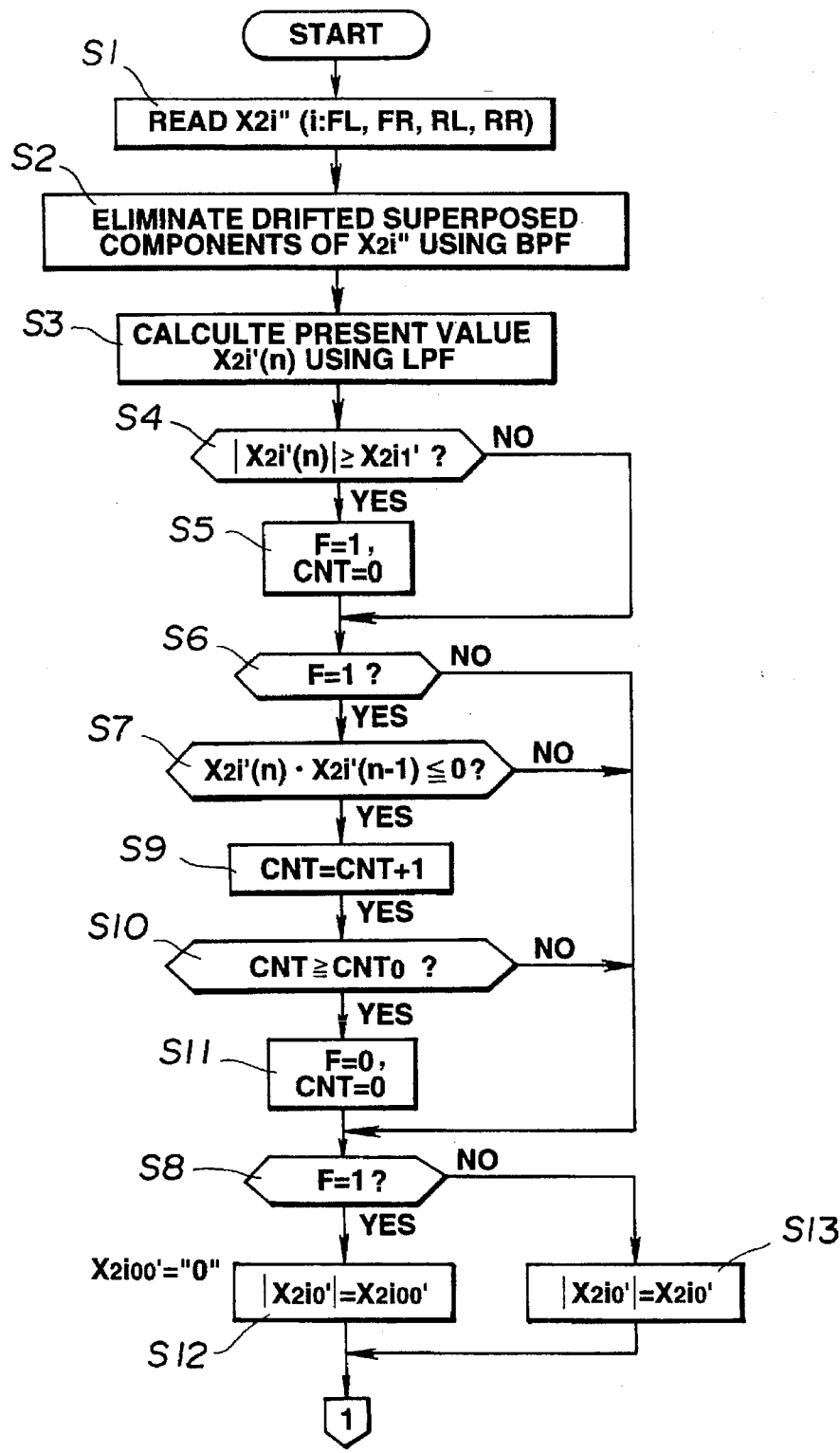
FIGS. 14A and 14B are flowcharts representing an arithmetic operation processing executed in the embodiment of the damping force controlling apparatus according to the present invention.
Figure 14B:
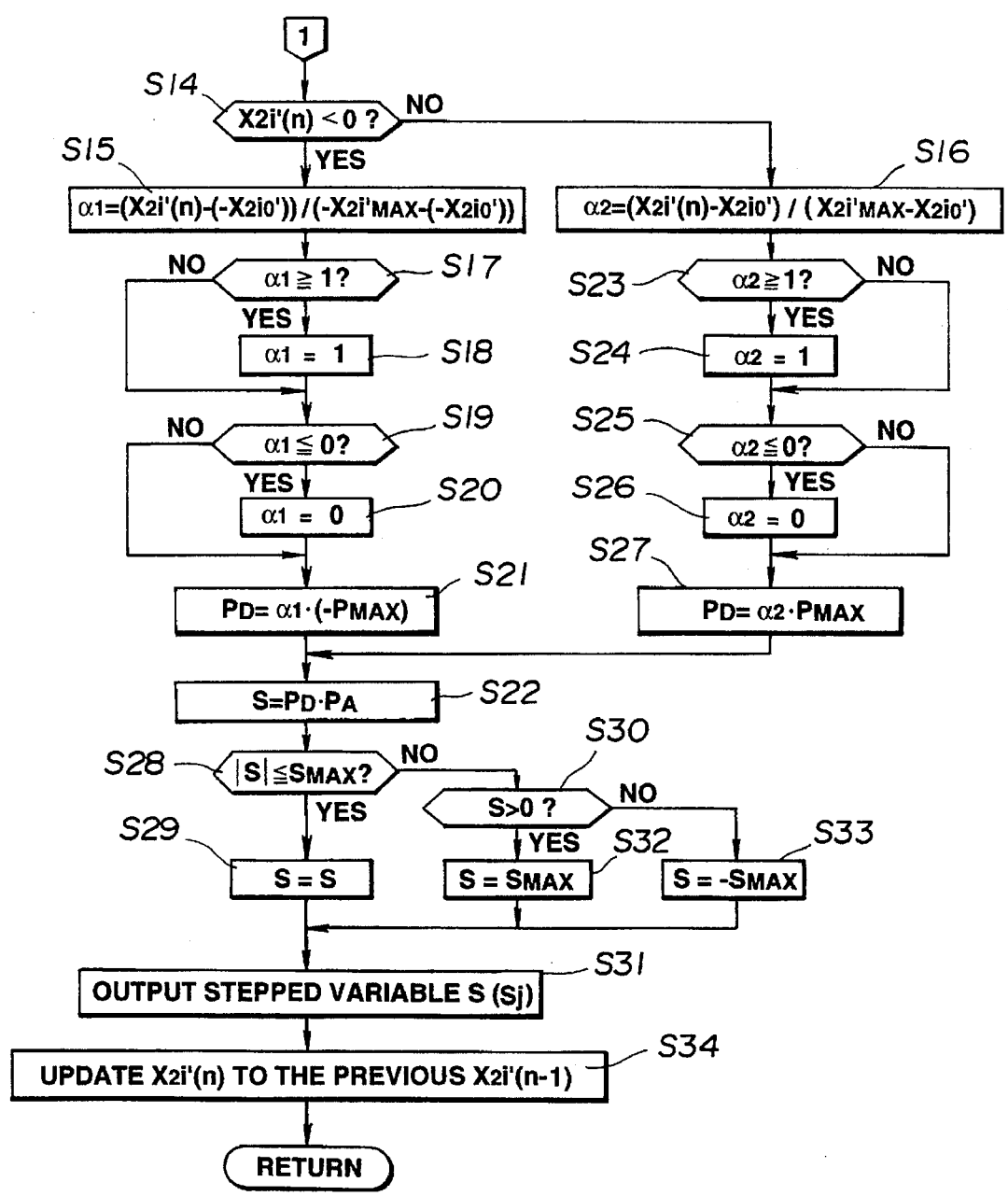

Next, FIGS. 14A and 14B integrally show a damping force control calculation processing executed in the CPU 56c of the microcomputer 56 in order to achieve the correlation characteristic of the sprung mass vertical velocity—target position—damping force by which the effective damping force is emanated for the large oscillating input in accordance with the above-described basic principle.

In the embodiment shown in FIGS. 14A and 14B, the basically set target position $P_D$ is calculated in accordance with calculation formulae not derived from a table look-up technique. In FIGS. 14A and 14B, a bit of "1" set in a control flag F indicates under a control such that the width of the dead zone is narrowed and a bit of "0" reset in the control flag F indicates under no control. The control flag F is reset when, for example, a vehicular ignition switch is turned on. The calculation processing shown in FIGS. 14A and 14B is executed in response to a timer interrupt for each predetermined sampling time as will be described later. The calculations of the calculated target position $P_D$ and the stepped quantity S of the corresponding one of the stepping motors and the damping force D/F at the target position $P_D$ are carried out in a predetermined order such as first the front left road wheel interposed shock absorber 3FL, second, the rear left road wheel interposed shock absorber 3RL, third, the front right road wheel interposed shock absorber 3RL, and, fourth, the rear right road wheel interposed shock absorber 3RR. In addition, a present position $P_A$ updated and stored in the memory unit 56d for each calculation processing of FIGS. 14A and 14B and a previous value $X_{2i'}$ (n−1) of the sprung mass vertical velocity are temporarily read in a buffer of the calculation processing unit, i.e., the CPU 56c for each calculation processing of FIGS. 14A and 14B.

The calculation processing of FIGS. 14A and 14B is executed for each predetermined time $\Delta T$ (for example, 3.3 msec.) as a timer interrupt routine.

At a first step S1, the CPU 56c reads each sprung mass vertical acceleration detected value $X_{2i''}$ (i=FL, FR, RL, and RR) detected by means of each corresponding one of the sprung mass vertical acceleration sensors S1FL through 51RR.

Next, at a step S2, a digital high pass filter structured by, for example, the self-contained program carries out a high pass filtering for each sprung mass vertical acceleration detected value $X_{2i''}$ read at the step S1 so as to eliminate drift superimposed components for the respective sprung mass vertical acceleration detected values $X_{2i''}$. It is noted that a cut-off frequency of the digital high pass filter is set by appropriately selecting a first-order (environmental) variable of the program structuring the high pass filter.

Next, at a step S3, a digital low pass filter structured by, for example, a self-contained program carries out a low pass filtering for the respective sprung mass vertical acceleration detected values $X_{2i''}$ from which the drift superimposed components are eliminated to derive a current (present) value $X_{2i'(n)}$ of each sprung mass vertical velocity in which its phase is adjusted to meet the phase of the corresponding one of the currently detected sprung mass vertical acceleration detected values as an integrated value for the corresponding one of the sprung mass vertical acceleration detection value. It is noted that a cut-off frequency of the digital low pass filter structured by the program can be set to an appropriate value by selecting appropriately the first-order variable of the program structured by the program. In addition, the calculations of the respective sprung mass vertical velocities $X_{2i'(n)}$ may be carried out using integration calculation routines in place of the digital low pass filtering program.

Next, at a step S4, the CPU 56c determines whether the absolute value $|X_{2i'(n)}|$ of each of the presently calculated sprung mass vertical velocities calculated and set at the step S3 is equal to or above the sprung mass vertical velocity upper and lower limit values $X_{2i1}$, or not.

If Yes, namely, the absolute value $|X_{2i'(n)}|$ of the currently derived value of each of the sprung mass vertical velocities calculated and set at the step S3 is equal to or above the sprung mass vertical velocity upper and lower limit threshold values $X_{2i1}$, at the step S4, the routine goes to a step S5. If No at the step S4, the routine goes to a step S6.

At the step S5, the dead zone width control flag F is set to "1" and the zero crossing counter CNT is cleared to "0". Then, the routine goes to a step S6.

At the step S6, the CPU 56c determines whether the dead zone width control flag F is set to "1". If the dead zone width control flag F is set to "1", the routine goes to a step S7. If not "1" at the step S6, the routine goes to a step S8.

At the step S7, the CPU 56c determines whether a produce of the present value $X_{2i'(n)}$ of the sprung mass vertical velocity and the previous value $X_{2i'(n-1)}$ of the sprung mass vertical velocity is equal to or below "0", that is to say, the sprung mass vertical velocity $X_{2i'}$ has presently crossed zero point.

If Yes at the step S7, in details, the CPU 56c determines that the product of the present and previous values of the sprung mass vertical velocities is equal to or below zero, namely, the sprung mass vertical velocity $X_{2i'}$ presently crosses zero, the routine goes to a step S9. If No at the step S7, the routine goes to the step S8.

At the step S9, the zero crossing counter CNT is incremented by plus one (CNT=CNT+1) and, thereafter, the routine goes to a step S10.

At the step S10, the CPU 56c determines whether the value of the zero crossing counter CNT is equal to or above the predetermined zero crossing count value $CNT_0$ or not. If $CNT \geq CNT_0$ (Yes) at the step S10, the routine goes to a step S11. If $CNT<CNT_0$ (No) at the step S10, the routine jumps to the step S8.

At the step S11, the dead zone width control flag F is reset to "0" with the zero crossing counter CNT cleared and the routine goes to the step S8.

At the step S8, the CPU 56c determines whether the dead zone width control flag F is already set to "1". If the dead zone width control flag F is set to "1" (Yes) at the step S8, the routine goes to a step S12. If not set to "1" (No) at the step S8, the routine goes to a step S13.

At the step S12, the CPU 56c sets the absolute value $|X_{2i0}|$ of the dead zone threshold value to the predetermined value $X_{2i00}$, namely, "0" and the routine goes to a step S14.

On the other hand, at the step S13, the CPU 56c sets the absolute value $|X_{2i0}|$ of the dead zone threshold value to an initial value of $X_{2i0}$, and the routine goes to a step S14.

At the step S14, the CPU 56c determines whether the present value $X_{2i'(n)}$ of the sprung mass vertical velocity is below "0", namely, indicate negative.

If the present value $X_{2\dot{r}(n)}$ thereof indicates negative (Yes), the routine goes to a step S15. If No, namely, the present value $X_{2\dot{r}(n)}$ indicates positive at the step S14, the routine goes to a step S16.

At the step S15, the CPU 56c calculates the compression phase target position proportional constant $\alpha_1$ in accordance with the equation (5) using the compression phase maximum sprung mass vertical velocity $(-X_{2\dot{r}MAX})$, the present value $X_{2\dot{r}(n)}$ of each sprung mass vertical velocity calculated and set at the step S3 and the negative dead zone threshold value $(-X_{2\dot{r}0})$ set at the step S12 or step S13 and the routine goes to a step S17. It is noted that if the absolute value of $|(-X_{2\dot{r}0}|$ of the negative dead zone threshold value is the same as the positive dead zone threshold value $|X_{2\dot{r}0}|$, double brackets { } in the equation (5) may be omitted $(\alpha_1=(X_{2\dot{r}}-(-X_{2\dot{r}0})/(-X_{2\dot{r}MAX}))$.

$$\alpha_1=\{(X_{2\dot{r}}-(-X_{2\dot{r}0})\}/(-X_{2\dot{r}MAX}) \qquad (5)$$

At the step S17, the CPU 56c determines whether the compression phase target position proportional constant $\alpha_1$ calculated at the step S15 is equal to or above the value of "1". If the compression phase target position proportional constant $\alpha$ is equal to or above the value of "1", the routine goes to a step S18. If not the value of "1" (No) at the step S17, the routine jumps to a step S19.

At the step S19, the compression phase target position proportional constant $\alpha_1$ is set to "1" and the routine goes to the step S19.

At the step S19, the CPU 56c determines whether the compression phase target position proportional constant $\alpha_1$ calculated at the step S18 is equal to or below "0" or not. If $\alpha_1 \leq 0$ (Yes) at the step S19, the routine goes to a step S20. If $\alpha_1 > 0$ (No) at the step S19, the routine goes to a step S21.

At the step S20, the CPU 56c sets $\alpha_1$="0" and the routine goes to the step S21.

At the step S21, the CPU 56c calculates the compression phase, namely, the negative direction target position $P_D$ in accordance with the following equation (6) using the compression phase maximum position $(-P_{MAX})$ and the compression phase target position proportional constant $\alpha_1$ set at any one of the steps of S15, S18 or S20. Thereafter, the routine goes to a step S22.

$$P_D=\alpha_1 \cdot (-P_{MAX}). \qquad (6)$$

On the other hand, at the step S16, the extension phase target position proportional constant $\alpha_2$ in accordance with the following equation (7) using the extension phase maximum sprung mass vertical velocity $X_{2\dot{r}MAX}$, each sprung mass vertical velocity calculated value $X_{2\dot{r}}$ calculated at the step S3, and the positive dead zone threshold value $X_{2\dot{r}0}$ set at the step S12 or S13 and, thereafter, the routine goes to a step S23.

$$\alpha_2=(X_{2\dot{r}}+X_{2\dot{r}0})/X_{2\dot{r}MAX}. \qquad (7)$$

At the step S23, the CPU 56c determines whether the extension phase target position proportional constant $\alpha_2$ is equal to or above 1 or not. If $\alpha_2 \geq$ "1" (Yes) at the step S23, the routine goes to a step S24. If No, namely, $\alpha_2 <$ "1" at the step S23, the routine jumps to a step S25.

At the step S24, the compression phase target position proportional constant $\alpha_2$ is set to "1" and the routine goes to the step S25.

At the step S25, the CPU 56c determines whether the extension phase target position proportional constant $\alpha_2$ is equal to or below "0" or not.

If $\alpha_2 \geq 0$ at the step S25 is equal to or below 0 (Yes), the routine goes to a step S26. If No ($\alpha_2>0$, the routine jumps to a step S27.

At the step S26, the extension phase target position proportional constant $\alpha_2$ is set to "0" and the routine goes to the step S27.

At the step S27, the extension phase, namely, the positive direction target position $P_D$ is calculated in accordance with the following equation (8) using the extension phase target position proportional constant $\alpha_2$ set at the step S16, step S24, or step S26 and the extension phase maximum position $P_{MAX}$.

$$P_D=\alpha_2 \cdot P_{MAX}. \qquad (8)$$

At the step S22, the CPU 56c calculates the subtraction of present position $P_D$ set at the step S21 or step S27 from the present position $P_A$ updated and stored previously in the memory unit 56d to calculate the revolution angle of each corresponding one of the stepping motor 41FL through 41RR as the stepping quantity S. Then, the routine goes to a step S28.

At the step S28, the CPU 56c determines whether the absolute value of |S| of the stepping quantity (variable) set and calculated at the step S22 is equal to or below the maximum stepping quantity $S_{MAX}$ achieved at once the calculation processing previously set. If the absolute value |S| of the stepping variable is equal to or below the maximum stepping quantity at the step S28, the routine goes to a step S29. If No at the step S28, the routine goes to a step S30.

At the step S29, the CPU 56c sets the stepping variable S calculated at the step S22 directly to the stepping variable S which is the control signal to be supplied to the stepping motor and the routine goes to a step S31.

At the step S30, the CPU 56c determines whether S>"0" (positive). If Yes (positive) at the step S30, the routine goes to a step S32. If No ($S \geq 0$) at the step S30, the routine goes to a step S33.

At the step S32, the CPU 56c sets the stepping quantity (variable) S which is the control signal to the corresponding one of the stepping motors to the maximum stepping variable $S_{MAX}$ and the routine goes to a step S31.

At the step S33, the CPU 56c sets the stepping variable S which is the control signal to the corresponding one of the stepping motors to the maximum stepping variable having a minus value of $(-S_{MAX})$ and the routine goes to the step S34.

At the step S31, the CPU 56c outputs the stepping variable S in the form of the control signal set at any one of the steps of S29, S32, or S33 to the corresponding one of the stepping motors 59FL through 59RR and the routine goes to a step S34.

At the step S34, the present value $X_{2\dot{r}(n)}$ of the corresponding one of the respective sprung mass vertical velocities $X_{2\dot{r}(n)}$ is updated and stored in a predetermined memory area as the previous sprung mass vertical velocity $X_{2\dot{r}(n-1)}$. Then, the routine returns to the main program, i.e., the step S1 at the next incoming interrupt sampling time.

FIGS. 15A, 15B, 15C, 15D, and 15E show integrally a timing chart for explaining an operation of the damping force controlling apparatus and method in the embodiment according to the present invention in which the calculation processing of FIGS. 14A and 14B was executed and repeated.

The timing charts shown in FIGS. 15A through 15E were simulation results when the vehicle in which the damping force controlling apparatus and method in the embodiment has been installed ran straight at a relatively stable vehicle speed on a road surface on which minute impulsive convex and a subsequent impulsive recess were continued. The other road surfaces excepting the impulsive convex and impulsive recess portions were not so perfectly flat (so called, mirror type road surface) but minute convexities and recesses were continuously present. In addition, such oscillations as those generated on the vehicular engine, power transmission, and/or vehicular power train system were not included in the sprung mass vertical velocities $X_{2i'}$ (i=FL, FR, RL, and RR) emanated on the sprung mass. Furthermore, the above-described predetermined zero crossing count value $CNT_0$ was, for conveniences, "5".

It is noted that a zero point means a point at which each of the sprung mass vertical velocities $X_{2i'0}$ indicates zero, i.e., a vehicle height at which neither upward nor downward movement of the vehicle body is observed. It is also noted that an increase in a positive region means that an absolute value of $X_{2i'}$ is increased in the positive region, a decrease in the positive region means that the absolute value of $X_{2i'}$ is decreased in the positive region, an increase of $X_{2i'}$ in a negative region means that the absolute value of $X_{2i'}$ is decreased toward the positive region, and a decrease of $X_{2i'}$ in the negative region means that the absolute value of $X_{2i'}$ is increased in the negative region.

A) While the vehicle ran straight on the road surface during a time duration from a time $t_{00}$ to a time $t_{04}$ and passed the impulsive convex portion approximately at the time $t_{04}$, the sprung mass vertical velocity $X_{2i'}$ was relatively slow and fluctuated in a minute fashion. Specifically, the sprung mass vertical velocity $X_{2i'}$ was increased at the time $t_{00}$ in the positive region as shown in FIGS. 15A and 15B and was turned toward the decrease direction at a certain time between $t_{00}$ and $t_{01}$, the gradient of the increase in $X_{2i'}$ gradually being decreased. Thereafter, the sprung mass vertical velocity $X_{2i'}$ was furthermore continued to be decreased. At the time $t_{01'}$, the sprung mass vertical velocity $X_{2i'}$ crossed the zero point and dropped in the negative region. Thereafter, at a certain time between $t_{01}$ and $t_{02}$, the gradient of decrease in the negative region was turned toward the positive region. At the time $t_{02}$, the sprung mass vertical velocity $X_{2i'}$ again crossed the zero point. At a certain time between $t_{02}$ and $t_{03}$, the gradient of the increase in the sprung mass vertical velocity $X_{2i'}$ was turned to zero (at a local maximum) and the turned sprung mass vertical velocity $X_{2i'}$ was, in turn, decreased. At the time $t_{03}$, the sprung mass vertical velocity $X_{2i'}$ again crossed the zero point. Then, the sprung mass vertical velocity was turned toward the increase direction, i.e., toward the positive region. At the time $t_{04}$, the sprung mass vertical velocity $X_{2i'}$ again crossed the zero point and increased toward the positive region.

Since, during the whole time duration from the time $t_{00}$ to the time $t_{04}$, the sprung mass vertical velocity $X_{2i'}$ has the local maximums and minimums all of which do not exceed the above-described sprung mass vertical velocity upper and lower limit threshold values ($\pm X_{2i1'}$), the routine shown in FIGS. 14A and 14B passed through the step S4, the step S6, and the step S8 for each sampling period of aT at which the calculation processing of FIGS. 14A and 14B was executed. Then, since the dead zone width control flag F was still reset to "0", the routine passed through the step S13 in which the positive and negative dead zone threshold values ($\pm X_{2i'0}$) were maintained at the initial (original) values $\pm X_{2i'0}$.

In addition, the local peak points (maximums and minimums) of the varying sprung mass vertical velocity $X_{2i'}$ did not exceed these dead zone threshold values ($\pm X_{2i'0}$), even thus originally set widened dead zone threshold values ($\pm X_{2i'0}$). Hence, although the extension phase target position proportional constant $\alpha_2$ was calculated at the step S16 transferred from the step S14 for each sampling period of $\Delta T$ at which the calculation processing of FIGS. 14A and 14B was executed during the two time durations from the time $t_{00}$ to the time $t_{01}$ and from the time $t_{02}$ to the time $t_{03}$ during which the sprung mass vertical velocity $X_{2i'}$ was in the positive region. a numerator of the equation (7) was always a negative value and the calculated extension phase target position proportional constant $\alpha_2$ was also always the negative value since the local maximum values of the sprung mass vertical velocity $X_{2i'0}$ during these time durations do not exceed the positive dead zone width threshold value $X_{2i'0}$. Hence, the routine passed through the step S26 from the step S25 and, at the step S26, the extension phase target position proportional constant $\alpha_2$ was set to "0". Hence, the target position $P_D$ calculated at the step S27 was also set to "0".

On the other hand, although the routine passed from the step S14 to the step S15 to calculate the compression phase target position proportional constant $5_1$ for each sampling period $\Delta T$ at which the calculation processing of FIGS. 14A and 14B during the other two time durations from the time $t_{01}$ to the time $t_{02}$ and from the time $t_{03}$ to the time $t_{04}$ during which the sprung mass vertical velocity $X_{2i'}$ indicated negative, the local minimum points of The sprung mass vertical velocity $X_{2i'0}$ during each of These two time durations did not exceed the negative dead zone threshold value ($-X_{2i'0}$). Hence. the numerator in the equation (5) was always positive value and its denominator in the equation (5) always indicated the negative value. Consequently, the calculated compression phase target position proportional constant $\alpha_1$ was always negative value so that the routine of FIGS. 14A and 14B transferred from the step S19 to the step S20. Thus, the compression phase target position proportional constant $\alpha_1$ was set to "0" and. therefore. the target position $P_D$ calculated at the step S21 was also set to "0". As described above, the target position $P_D$ calculated at the step S21 was continued to be maintained at "0". Hence, the control signal, i.e., the stepping variable Sj outputted at the steps S22 through S31 was "0". and the achieved target position P of the valve body gave "0". The damping force D/F emanated from each corresponding one of the shock absorbers 3FL through 3RR was maintained at the minimum damping force D/Fmin at both extension and compression phases. Since the sprung mass vertical velocity $X_{2i'}$ during the whole time duration from the time $t_{00}$ to the time $t_{04}$ was relatively slow and small, the vehicle body as the sprung mass oscillated very slowly and at the small amplitudes so that the smooth riding comfort could be achieved. It is noted that due to no actuation to the stepping motors, the whole noise evaluation on the stepping motor and valve body could be improved during the whole time duration from the time $t_{00}$ to the time $t_{04}$.

B) Next, at a time immediately after the passage of the time $t_{04}$, the vehicle passed the impulsive road convex portion so that the sprung mass vertical velocity $X_{2i'}$ was furthermore accelerated in the positive region. At a time $t_{05}$, the sprung mass vertical velocity $X_{2i'}$ exceeded the positive low damping sprung mass vertical velocity threshold value $X_{2i01'}$ set larger than the positive dead zone threshold value $X_{2i'0}$. Thereafter. the sprung mass vertical velocity $X_{2i'}$ further increased and exceeded the positive sprung mass vertical velocity upper limit threshold value $X_{2i1'0}$ at a time $t_{06}$ Hence. since, during the time duration from the time $t_{04}$ to the time $t_{05}$, the sprung mass vertical velocity $X_{2i'}$ did not still exceed the positive sprung mass vertical velocity upper limit threshold value $X_{2r1}$ for each sampling period $\Delta T$ at which the calculation processing of FIGS. 14A and 14B was executed, the routine of FIGS. 14A and 14B transferred from the step S4 to the step S6 and the step S8 in which the dead zone width control flag F was reset to "0" and then transferred to the step S18 in which the positive and negative dead zone threshold values ($\pm X_{2r0}$) were maintained to the initial values of ($\pm X_{2r0}$). Furthermore, the extension phase target position proportional constant (coefficient) $\alpha_2$ was calculated at the step S16 transferred from the step S14. Since the extension phase target position proportional constant $\alpha_2$ was not equal to or above "1" nor equal to or below "0", the target position $P_D$ in accordance with the extension phase target position proportional constant $\alpha_2$ was calculated at the step S27. The control signal to follow the target position $P_D$ was output as the stepping variable Sj at the steps of S22 through S31. The stepping motor corresponding to each damping force variable shock absorber responded on a real time base so that the position P was followed up. It is noted that since the damping force at the position P achieved during the time duration from the time $t_{04}$ to the time $t_{05}$ until the sprung mass vertical velocity exceeded the positive low damping sprung mass vertical velocity threshold value $X_{2r01}$ was still the minimum damping force at both extension and compression phases, the sprung mass vertical velocity $X_{2r}$ was not so effectively damped.

However, since, during the time duration from the time $t_{05}$ to the time $t_{06}$, the sprung mass vertical velocity $X_{2r}$ did not still exceed the positive sprung mass vertical velocity upper limit threshold value $X_{2r1}$ for each sampling period of time $\Delta T$ at which the calculation processing of FIGS. 14A and 14B was executed, the routine shown in FIGS. 14A and 14B was transferred to the steps S6 and S8 from the step S4 and was transferred to the step S13 since the dead zone width control flag F was still reset to "0", the positive and negative dead zone threshold values ($\pm X_{2r0}$ maintained at the initial values of ($\pm X_{2r0}$). Then, in the same way as the time durations from the time $t_{04}$ to the time $t_{05}$, the target position $P_D$ was calculated and set so that the control signal to follow the target position $P_D$ was output as the stepping variable Sj at the steps S22 through S31. Each of the stepping motors 41FR through 41RR mechanically connected to the corresponding one of the damping force variable shock absorbers 3FR through 3RR was responded on the real time base so that the position P was followed up and controlled. The extension phase damping force D/F achieved, at this time, for each calculation processing sampling time aT provides the effective damping force D/F which accords with the direction and magnitude of the sprung mass vertical velocity $X_{2r}$ so that the gradient of the increase in the sprung mass vertical velocity $X_{2r}$ was gradually reduced. The specific action of the damping force is the same as the explanation with reference to FIGS. 11A through 11C.

C) Thereafter, the sprung mass vertical velocity $X_{2r}$ exceeding the positive sprung mass vertical velocity upper limit threshold value $X_{2r\ 1}$ at the time $t_{06}$ was started to decrease at a certain time between the times $t_{06}$ and $t_{07}$ in the positive region, decreasing the gradient of increase gradually decreasing due to the damping action, and, thereafter, at the time $t_{07}$, was decreased below the positive sprung mass vertical velocity upper limit threshold value $X_{2r1}$.

At the first sampling time at which the routine shown in FIGS. 14A and 14B was executed after the time $t_{05}$, the routine transferred from the step S4 to the step S5 to set the dead zone width control flag F to "1" and to clear again the value of the zero crossing counter CNT (CNT=0) and the routine transferred from the step S6 to the seep S7. However, the routine transferred from the step S7 to the step S8 since the sprung mass vertical velocity $X_{2r}$ was still positive and the product between the present value $X_{2r(n)}$ and the previous value $X_{2r(n-1)}$ was positive. Then, the routine transferred from the step S8 to the step S12 so that the positive and negative dead zone threshold values ($\pm X_{2r0}$) was set to a predetermined value, for example, zero ($\pm X_{2i00}$="0"). Using the positive dead zone threshold value $X2i_0$, set to "0", the extension phase target position $P_D$ was calculated at the steps of S14, S16, S23 through S27. The control signal to follow up the target position $P_D$ was output as the stepping variable Sj at the steps S22 through S31. Each of the stepping motors associated with the corresponding one of the damping force variable shock absorber responded on the real time base for the target position $P_D$ so that the position P was followed up and controlled. Thereafter, the operational flow was repeated until at least time $t_{07}$ so that the effective damping D/F was emanated which accords with the direction and magnitude of the sprung mass vertical velocity $X_{2r}$. However, the extension phase damping force D/F at least during the time duration from the time $t_{06}$ to the time $t_{07}$ became large by a ratio between the denominator and the numerator in the equation (7) which corresponds to the narrowed dead zone width. specifically with the dead zone eliminated and when at least the sprung mass vertical velocity $X_{2r}$ falls in the positive range, the sprung mass vertical velocity $X_{2r}$ was favorably damped and converged. This is effective since the sprung mass vertical velocity $X_{2r}$ emanated as the vehicle body oscillation output was so large as exceeding the positive sprung mass vertical velocity upper limit threshold value $X_{2i1}$.

D) Thereafter, after the sprung mass vertical velocity $X_{2r}$ decreased in the positive region was reduced below the positive sprung mass vertical velocity upper limit threshold value $X2i_1$, at the time $t_{07}$, the positive sprung mass vertical velocity $X_{2r}$ was reduced below the positive low damping sprung mass vertical velocity threshold value $X_{2i01}$, which was approached to zero along with the positive dead zone threshold value $X_{2i0}$, due to the elimination of the dead zone at a time $t_{08}$. Furthermore, due to an oscillating action of the large sprung mass oscillation, the sprung mass vertical velocity $X_{2r}$ crossed the zero point at a time $t_{09}$ so as to be turned to be decreased and crossed the negative low damping sprung mass vertical velocity threshold value ($-X_{2i01}$) at a time $t_{10}$. During the time duration from the sampling time at which the routine shown in FIGS. 14A and 14B was executed after the time $t_{07}$ to the sampling time at which the calculation processing shown in FIGS. 14A and 14B was executed, the same flowchart as the time duration from the time $t_{06}$ to the time $t_{07}$ was repeated. During the time duration from the time $t_{07}$ to the time $t_{08}$, since the sprung mass vertical velocity $X_{2r}$ exceeded and decreased the positive sprung mass vertical velocity upper limit threshold value $X_{2i1}$, the effective damping force D/F was emanated which accords with the direction and magnitude of the sprung mass vertical velocity $X_{2r}$ with the elimination of the dead zone. However, during the time duration from the time $t_{08}$ to the time $t_{09}$, the sprung mass vertical velocity $X_{2r}$ decreased and exceeded the positive low damping sprung mass vertical velocity threshold value $X_{2i01}$, so that both extension phase and compression phase damping forces D/F provided the minimum damping forces D/Fmin. Thus, the damping effect was reduced. However, a normal control extension phase damping force $D/F_N$ from the time $t_{06}$ in which the dead zone width control was not carried out is apparently smaller than the extension phase damping force D/F in which the dead zone width was narrowed, as denoted by a phantom line shown in FIG. 15E. The damping effect on the positive going sprung mass vertical velocity $X_{2i'}$ may correspondingly be reduced in the case of $D/F_N$. Furthermore, the normal control extension phase damping force $D/F_N$ which provided the minimum damping force D/Fmin became earlier than the time $t_{08}$. With these matters combined, the damping effect may furthermore be reduced for the sprung mass vertical velocity $X_{2i'}$.

On the other hand, at the first sampling time at which the routine of FIGS. 14A and 14B was executed after the time $t_{09}$, the routine shown in FIGS. 14A and 14B was transferred from the step S4 to the step S6 and, then, to the step S7. At this time, at the time $t_{09}$, the sprung mass vertical velocity $X_{2i'}$ crossed zero point so that the sprung mass vertical velocity $X_{2i'}$ was turned from the positive region to the negative region. Hence, since the product between the previous value and present value indicated negative. Hence, the routine was advanced to the step S9 in which the zero crossing counter CNT was incremented by one to indicate "1". However, since, at the subsequent step S10, the zero crossing counter CNT was smaller than the predetermined count value $CNT_0$, namely, "5", the routine was advanced to the step S8. Next, at the step S12, the positive and negative dead zone threshold values ($\pm X_{2i0'}$) were continued to the predetermined values ($\pm X_{2i00}$=0), the routine was transferred from the step S14 to the step S15 in which the compression phase target position proportional constant (coefficient) $\alpha_1$ was calculated. Since the compression phase target position proportional constant (coefficient) $\alpha_1$ was neither equal to "1" nor below "0", the target position $P_D$ in accordance with the compression phase target position proportional constant (coefficient) $\alpha_1$ was calculated. The control signal to follow up the target position $P_D$ was output to the corresponding one of the stepping motors as the stepping variable Sj at the steps S22 through S31. Thereafter, since the sprung mass vertical velocity $X_{2i'}$ was continued in the negative region at the step S7, the product between the previous value and present value was positive and the routine was transferred to the step S8 to calculate the compression phase target position $P_D$ at the steps S14 through S21. At the steps from the step S22 to the step S31, the stepping variable Sj to achieve the target position $P_D$ was output as the control signal. The corresponding one of the stepping motors 41FR through 41RR connected to each of the damping force variable shock absorbers responded on the real time base so that the position P was followed up and controlled. However, the damping force of the position P achieved at the time duration from the time $t_{09}$ to the time $t_{10}$ during which the sprung mass vertical velocity exceeded the negative low damping sprung mass vertical velocity threshold value ($-X_{2i01'}$) was still the minimum damping Forces D/Fmin at both extension and compression phases. Hence, the sprung mass vertical velocity $X_{2i'}$ was not so effectively damped.

E) Although the sprung mass vertical velocity $X_{2i'}$ which was reduced below the negative low damping sprung mass vertical velocity threshold value ($-X_{2i01'}$) at the time $t_{10}$ and was continued to be reduced in the negative region, the gradient of decrease was soon decreased according to the favorable damping effect of the damping force variable shock absorber as will be described later. Then, after the sprung mass vertical velocity $X_{2i'}$ was turned to increase toward the positive region at a certain time between $t_{10}$ and $t_{11}$, the sprung mass vertical velocity $X_{2i'}$, in turn, crossed and increased above the negative low damping sprung mass vertical velocity threshold value ($-X_{2i01'}$) at the time $t_{11}$. Furthermore, the sprung mass vertical velocity $X_{2i'}$ crossed the zero point at a time $t_{12}$ so as to increase toward the positive region. Then, at a time $t_{13}$, the sprung mass vertical velocity $X_{2i'}$ exceeded the positive low damping sprung mass vertical velocity threshold value $X_{2i01'}$. It is noted that, during the time duration from the time $t_{10}$ to the time $t11$, the sprung mass vertical velocity $X_{2i'}$ was not below the negative sprung mass vertical velocity threshold value ($-X_{2i1'}$). During the time duration after the time $t_{10}$ at which the first sampling period for the routine of FIGS. 14A and 14B was executed to the time immediately after the time $t_{12}$ at which the sampling period of the routine shown in FIGS. 14A and 14B was executed, the same processing flowchart as that during the time duration from the time $t_{09}$ to the time $t_{10}$ excepting the increment of the zero crossing counter CNT for each sampling period of time $\Delta T$ at which the calculation processing of FIGS. 14A and 14B was executed. During the time duration from the time $t_{10}$ to the time $t_{11}$, the sprung mass vertical velocity $X_{2i'}$ exceeded the negative low damping sprung mass vertical velocity threshold value ($-X_{2i01'}$) so that the effective damping force D/F could be emanated which accords with the direction and magnitude of the sprung mass vertical velocity $X_{2i'}$ which were increased by a quantity corresponding to the elimination of the dead zone. During the time duration from the time $t_{10}$ to the time $t_{11}$, the negatively going sprung mass vertical velocity $X_{2i'}$ was above the negative sprung mass vertical velocity lower limit threshold value ($-X_{2i1'}$). The extension phase and compression phase damping forces $D/F_N$ provided the minimum damping forces D/Fmin and the damping effect was reduced.

However, the normal control compression phase damping force $D/F_N$, as denoted by the phantom line of FIG. 15E, from the time $t_{10}$ in which no dead zone width control was carried out was apparently smaller than the compression phase damping force D/F in which the dead zone width was narrowed (eliminated), as denoted by the solid line shown in FIG. 15E, so that the damping affect against the positively going sprung mass vertical velocity $X_{2i'}$ was accordingly reduced in the case of the normal control compression phase damping force $D/F_N$. Furthermore, since a time at which the normal control compression phase damping force $D/F_N$ was passed from the compression phase minimum damping force D/Fmin becomes later than the time $t_{10}$ and since a time at which the damping force $D/F_N$ returned to the minimum damping force D/Fmin becomes earlier than the time $t_{11}$. The damping effect in the case of the $D/F_N$ is estimated to be further smaller than that in the case of the damping force of D/F in which the dead zone width was narrowed (eliminated) against the sprung mass vertical velocity $X_{2i'}$ in a synergism action (the timing deviations).

In addition, at the first sampling time at which the calculation processing of FIGS. 14A and 14B was executed after the time $t_{12}$ at which the positively going sprung mass vertical velocity $X_{2i'}$ crossed the zero point, at the step S7, the product between the present value and previous value of the sprung mass vertical velocity $X_{2i'}$ indicated negative in the same way as the previous zero crossing time $t_{09}$ and, at the step S9, the zero crossing counter CNT was incremented by one to indicate "2". However, since, at the subsequent step S10, the count value of zero crossing counter CNT was smaller than 5 which was preset as the predetermined value $CNT_0$. Thereafter, the routine transferred from the step S8 to the step S12 so that the positive and negative dead zone threshold values ($\pm X_{2i0'}$) were continued to be set to the predetermined value ($\pm X_{2i00}$=0). Since the sprung mass vertical velocity $X_{2i'}$ was already positive at the time immediately after the time $t_{12}$, the target position $P_D$ was calculated in accordance with the extension phase target position proportional constant $\alpha_2$ at the steps from the step S16 to the step S27. The control signal to follow the target position $P_D$ was output as the stepping variable Sj at the steps of S22 through S81. Thereafter, since the sprung mass vertical velocity $X_{2i'}$ at the step S7 was continued to be positive. The product between the present value and the previous value indicated positive and the routine was transferred to the step S8. Then, the extension phase target position $P_D$ at the steps from the step S16 to the step S27 was calculated. At the subsequent steps S22 through S31, the stepping variable Sj to achieve the target position $P_D$ was outputted as the control signal. Then, the corresponding one of the stepping motors associated with each of the damping force variable shock absorbers responded on the real time base so that the position P was followed up and controlled. The extension and compression phase damping forces D/F of the position P achieved at the time duration from the time $t_{12}$ to the time $t_{13}$ during which the vertical velocity $X_{2i'}$ did not still exceed the positive low damping sprung mass vertical velocity threshold value $X_{2i01}$, provided the minimum damping forces D/Fmin in both of the extension and compression phases. Therefore, the sprung mass vertical velocity $X_{2i'}$ could not effectively be damped.

In addition, although the sprung mass vertical velocity $X_{2i'}$ above the positive low damping sprung mass vertical velocity threshold value $X_{2i01}$ at the time $t_{13}$ was continued to further be increased in the positive region, the gradient of increase was soon reduced due to its favorable damping effect of the corresponding one of the shock absorbers and was turned to decrease in the positive region at a certain time between times $t_{13}$ and $t_{14}$. At the time $t_{14}$, the vertical velocity $X_{2i'}$ was returned to pass through the positive sprung mass vertical velocity threshold value $X_{2i01'}$. Furthermore, the sprung mass vertical velocity $X_{2i'}$ crossed the zero point at a time $t_{15}$. At a time $E_{16}$, the velocity $X_{2i'}$ was decreased below the negative low damping sprung mass vertical velocity threshold value $(-X_{2i01'})$. However, during the time duration from the time $t_{13}$ to the time $t_{14}$, the sprung mass vertical velocity $X_{2i'}$ did not exceed the positive sprung mass vertical velocity upper limit threshold value $X_{2i1'}$, as shown in FIG. 15A.

During the time duration after the time $t_{13}$ after which the first routine shown in FIGS. 14A and 14B was executed to the time at least immediately before the routine shown in FIGS. 14A and 14B was executed, the same flowchart as that executed during the time from the time $t_{12}$ through the time $t_{13}$ except the increment of the zero crossing counter CNT was carried out for each sampling period of $\Delta T$ at which the routine shown in FIGS. 14A and 14B was executed. However, during the time duration from the time $t_{13}$ to the time $t_{14}$, the sprung mass vertical velocity $X_{2i'}$ exceeded the positive low damping sprung mass vertical velocity threshold value $X_{2i01'}$ so that the effective damping force D/F was emanated which accords with the direction and magnitude of the sprung mass vertical velocity $X_{2i'}$ by their magnitudes corresponding to the elimination of the dead zone. In addition, during the time duration from the time $t_{14}$ to the time $t_{15}$, the negatively going sprung mass vertical velocity $X_{2i'}$ exceeded the positive damping sprung mass vertical velocity threshold value $X_{2i01'}$ so that both of the extension and compression phase damping forces D/F provided minimum damping forces D/F min. The damping effect was accordingly reduced.

However, in this case, the normal control extension phase damping force $D/F_N$ derived at the time $t_{10}$ in which the dead zone width was not controlled was apparently smaller than the extension phase damping force D/F (the solid line of FIG. 15E) in which the dead zone width was controlled to be narrowed, as denoted by the phantom line of FIG. 15E, and accordingly the damping effect in the case of $D/F_N$ is estimated to be reduced against the negatively going sprung mass vertical velocity $X_{2i'}$. In addition, in the normal control extension phase damping force $D/F_N$, a time at which the damping force $D/F_N$ passed the minimum damping force D/Fmin became remarkably later than the time $t_{13}$ and a time at which the damping force $D/F_N$ provided the minimum damping force D/Fmin became remarkably earlier than the time $t_{14}$. Furthermore, the damping effect achieved by $D/F_N$ against the sprung mass vertical velocity $X_{2i'}$ is estimated to be further reduced in the synergism action.

Then, at the first sampling period at which the routine shown in FIGS. 14A and 14B was executed after the zero crossing time $t_{15}$, the product of the previous value and present value of the sprung mass vertical velocity $X_{2i'}$ indicated negative at the step S7 in the same way as the time $t_{09}$ and the zero crossing counter CNT was incremented by one to indicate "3" at the step S9. However, at the subsequent step S10, since the zero crossing counter CNT indicated smaller value than the predetermined value of "5", the routine was transferred from the step S8 to the step S12 in order to maintain the positive and negative dead zone threshold values $(\pm X_{2i0'})$ at the predetermined value $(\pm X_{2i00}="0")$. Since the sprung mass vertical velocity $X_{2i'}$ already gave the negative value, the target position $P_D$ which accords with the compression phase target position proportional constant 51 was calculated at the steps S14 and steps S15 through S21. The control signal to follow the calculated target position $P_D$ was output as the stepping variable Sj at the steps S22 through S31. Thereafter, since the sprung mass vertical velocity $X_{2i'}$ at the step S7 was continued to be the negative value, the product between the present value and previous value indicated positive and the routine was transferred to the step S8. In the same way as described above, the compression phase target position $P_D$ was calculated at the steps of S15 to S21 and the stepping variable Sj as the control signal to achieve the target position $P_D$ was output at the steps S22 through S81. Accordingly, the stepping motor of each damping force variable shock absorber responded on the real time base to the calculated target position $P_D$ so as to follow up the position P. The damping forces at the position P achieved at the time duration from the time $t_{15}$ to the time $t_{16}$ at which the sprung mass vertical velocity $X_{2i'}$ exceeded the negative low damping sprung mass vertical velocity threshold value $(-X_{2i01'})$ still provided the minimum damping forces D/Fmin at both compression and extension phases. Therefore, the sprung mass vertical velocity $X_{2i'}$ at this time was not so effectively damped.

Hence, after the time $t_{06}$, in the embodiment in which the dead zone is narrowed (substantially, the dead zone is eliminated), as compared with the case wherein the dead zone width is not varied nor controlled, the effective damping force D/F was so large which accords with the magnitude and direction of the respectively corresponding one of the sprung mass vertical velocity $X_{2i'}$ and the time at which the sprung mass vertical velocity $X_{2i'}$ enters the low damping force range, i.e., soft range (S—S range) set in order to secure the preferable riding comfort becomes later and the time at which it exceeds the soft range becomes earlier. Thus, the action time duration at which the damping force becomes effective is elongated. Hence, as denoted by the phantom line shown in FIG. 15A, the other sprung mass vertical velocity $X_{2i'}$ N in a case where the dead zone width is not controlled after the time $t_{05}$ to the vicinity to the time $t_{16}$ has still large amplitude and enlarged period. Thus, when the vehicle body of the sprung mass was fluctuated. However, the sprung mass vertical velocity $X_{2i'}$ in the embodiment has speedily converged due to the preferable damping effect, as denoted by the solid line of FIG. 15A. Thus, the amplitude and period of the velocity $X_{2i'}$ became reduced.

Consequently, the fluctuating sensation of the vehicle body, i.e., the vehicle body can be suppressed and, at the same time, a high convergence force of the fluctuations with the vehicle body solid sensation can be achieved.

F) The sprung mass vertical velocity $X_{2i'}$, thereafter, has continued to be decreased in the negative region since the time $t_{15}$. Since the vehicle passed the impulsive recess on the running road surface at a certain time immediately after the time $t_{15}$, the sprung mass vertical velocity $X_{2i'}$ was furthermore accelerated so as to cross the negative sprung mass vertical velocity lower limit value $(-X_{2i01'})$ at a time $t_{16}$ and cross the negative sprung mass vertical velocity lower limit threshold value $(-X_{2i1'})$ at a time $t_{17}$. However, the gradient of the decrease was soon gradually smaller due to the effective damping effect achieved by the corresponding one of the shock absorbers. At a certain time between times $t_{17}$ and $t_{18}$, the velocity $X_{2i'}$ was turned toward the increase direction in the negative region and again exceeded the negative low damping sprung mass vertical velocity lower limit threshold value $(-X_{2i1'})$ at the time $t_{18}$. The same operational flows were executed as those at the time duration from the time $t_{15}$ to the time $t_{16}$ except the time at which the increment of the zero crossing counter CNT was carried out for each sampling time $\Delta T$ at a start time of which the first calculation processing of FIGS. 14A and 14B was executed and at an end time of which the routine shown in FIGS. 14A and 14B was executed immediately before the time $t_{17}$. Since during the time duration from the time $t_{13}$ to the time $t_{14}$, the sprung mass vertical velocity $X_{2i'}$ exceeded the positive low damping sprung mass vertical velocity threshold value $X_{2i01'}$ so that the effective damping force D/F can be emanated which accords with the direction and magnitude of the sprung mass vertical velocity $X_{2i'}$ since the dead zone was eliminated. Furthermore, after the time $t_{17}$, at the first sampling time at which the calculation processing of FIGS. 14A and 14B was executed, the routine was transferred from the step S4 to the step S5 in the same way as the time $t_{06}$ so that the dead zone width control flag F was set again to "1" and the zero crossing counter CNT was cleared so that the routine was transferred from the step S6 to the step S7. However, since the sprung mass vertical velocity $X_{2i'}$ was still continuously negative. The product between the present value and previous value $(X_{2i'(n)} \times X_{2i'(n-1)}) \leq 0)$ was positive so that the routine was transferred from the step S8 to the step S12 to maintain the positive and negative dead zone threshold values $(\pm X_{2i0'})$ at the predetermined values $(\pm X_{2i00'} = "0")$. Next, at the steps S15 through S21, the compression phase target position $P_D$ was calculated at the steps S15 through S21. The control signal to follow up the position $P_D$ was output as the stepping variable Sj at the steps of S22 through S31. The stepping motor associated with each damping force variable shock absorber responded on the real time base for the target position $P_D$ to the calculated target position $P_D$ so that the position P was followed up and controlled. Thereafter, at least until the time $t_{18}$, the above-described flow was repeated. In the same way as the time duration from the time $t_{06}$ to the time $t_{07}$, the effective damping force D/F was emanated which accords with the direction and magnitude of the sprung mass vertical velocity $X_{2i'}$ in the same way as the time duration from the time $t_{06}$ to the time $t_{07}$.

G) Thereafter, after the positively going sprung mass vertical velocity $X_{2i'}$ in the negative region exceeded the negative sprung mass vertical velocity lower limit threshold value $(-X_{2i'1})$ at the time $t_{18}$, the vertical velocity $X_{2i'}$ crossed the zero point approached negative low damping sprung mass vertical velocity threshold value $(X_{2i01'}$ at a time $t_{19}$ and crossed the zero point at a time $t_{20}$ due to the fluctuating reaction against the further large sprung mass oscillations. Furthermore, at a time $t_{21}$, the vertical sprung mass velocity $X_{2i'}$ exceeded the positive low damping sprung mass vertical velocity threshold value $X_{2i01'}$. During the time duration from the time at which the first calculation processing of FIGS. 14A and 14B was executed after the time $t_{18}$ to the time at which the calculation processing of FIGS. 14A and 14b was executed to the time immediately after the zero crossing time $t_{20}$, the same flow as the time durations of the time $t_{17}$ to the time $t_{18}$ was repeated for each sampling period of $\Delta T$ during which the routine shown in FIGS. 14A and 14B was repeated. During the time duration from the time $t_{18}$ to the time $t_{19}$, the sprung mass vertical velocity $X_{2i'}$ was below the negative low damping sprung mass vertical velocity threshold value $X_{2i01'}$ so that the effective damping force D/F was emanated which accords with the direction and magnitude of the sprung mass vertical velocity $X_{2i'}$ by the magnitude corresponding to the elimination of the dead zone. Furthermore, at the first sampling period at which the calculation processing of FIGS. 14A and 14b was executed, the routine was transferred from the step S4 to the step S5 in the same way as the time $t_{06}$ to set again the dead zone width control flag F to "1" and the zero crossing counter CNT was cleared. The routine was transferred from the step S6 to the step S7. However, since the sprung mass vertical velocity $X_{2i'}$ was continued to be positive and the product between the present value and previous value was still positive. Therefore, the routine was transferred from the step S8 to the step S12 so as to continue to set the positive and negative dead zone threshold values $(\pm X_{2i0'})$ to the predetermined values $\pm X_{2i00'} = "0")$. Next, the compression phase target position $P_D$ was calculated at the steps of S15 to S21. Then, the control signal to follow the target position $P_D$ was output at the steps S22 through S31 as the stepping variable Sj. The stepping motor of each damping force variable shock absorber responded on the real time base to the target position $P_D$ to follow up the position P. Thereafter, the flow described above was repeated until at least the time $t_{18}$ so that the effective damping force D/F which accords with the direction and magnitude of the sprung mass vertical velocity $X_{2i'}$ in the same way as the time duration from the time $t_{06}$ to the time $t_{07}$ was emanated.

The positively going vertical sprung mass vertical velocity $X_{2i'}$ in the negative region exceeded the negative sprung mass vertical velocity lower limit value $(-X_{2i1'})$ at the time $t_{18}$ and crossed the zero approached negative low damping sprung mass vertical velocity threshold value $X_{2i01'}$ due to the elimination of the dead zone at the time $t_{19}$. The vertical velocity $X_{2i'}$ crossed the zero point at the time $t_{20}$ and increased in the positive region. At the time $t_{21}$, the vertical velocity $X_{2i'}$ increased and passed the the zero approached positive low damping sprung mass vertical velocity threshold value $X_{2i01'}$. During the time duration From the time after the time $t_{18}$ at which the first sampling time executing the routine shown in FIGS. 14A and 14B was executed to the time immediately before the zero crossing time $t_{20}$ at which the routine shown in FIGS. 14A and 14B was executed, the same operational flow as that during the time duration from the time $t_{17}$ to the time $t_{18}$ was repeated for each sampling period $\Delta T$.

During the time duration from the time $t_{18}$ to the time $t_{19}$, since the sprung mass vertical velocity $X_{2i'}$ was decreased and exceeded the negative low damping sprung mass vertical velocity threshold value $-X_{2i01'}$, the effective damping force D/F according to the direction and magnitude of the sprung mass vertical velocity $X_{2i'}$ by the magnitude corresponding to the elimination of the dead zone was emanated. During the time duration from the time $t_{19}$ to the time $t_{20}$, the vertical velocity $X_{2i'}$ was increased and above the negative low damping sprung mass vertical velocity threshold value $(-X_{2i01'})$ so that the extension and compression phase damping forces D/F provided the minimum damping forces D/Fmin and accordingly the damping effect was reduced. On the other hand, the normal control compression phase damping force D/F$_N$ derived from the time $t_{16}$, was apparently smaller than the compression phase damping force D/F corresponding to the dead zone width control, as denoted by the phantom line and solid line of FIG. 15E. Correspondingly, the damping effect achieved by the D/F$_N$ against the sprung mass vertical velocity $X_{2i'}$ in the negative region is estimated to be further reduced. Furthermore, since in the case of the normal control compression phase damping force D/F$_N$ a time at which the damping force D/F$_N$ passed the minimum damping force D/Fmin became later than the time $t_{16}$ and a time at which the damping force D/F$_N$ entered the minimum damping force D/Fmin became earlier than the time $t_{19}$. Consequently, the damping effect achieved by the damping force D/F$_N$ was furthermore reduced in the synergism action.

On the other hand, at the first sampling period at which the routine of FIGS. 14A and 14B was executed after the time $t_{20}$, the routine was transferred from the step S4 to the step S6 and transferred to the step S7. At this time, in the same way as the case at the time $t_{09}$, the product between the present value and previous value of the sprung mass vertical velocity $X_{2i'}$ was negative so that the routine was transferred to the step S9 in which the value of the zero crossing counter CNT was incremented by one to indicate "1" At the step S10, since the value of the zero crossing counter CNT was less than "5", the routine was transferred from the step S8 to the step S12 in which the positive and negative dead zone threshold values ($\pm X_{2i0}$) were continued to be set to the predetermined value ($\pm X_{2i00}$="0"). Next, the target position P$_D$ which accords with the compression phase target position proportional coefficient $\alpha_1$ was calculated from the step S14 to the steps S16 to S27. The control signal to follow up the target position P$_D$ was output as the stepping variable Sj through the steps S22 through S31. After the time $t_{20}$, since the sprung mass vertical velocity $X_{2i'}$ at the step S7 was continued to be in the positive region and the product calculated at the step S7 was positive and the routine was transferred to the step S8. As described above, the extension phase target position P$_D$ was calculated and the control signal corresponding to the stepping variable Sj was calculated to achieve the target position P$_D$ through the steps S22 through S31. The stepping motor for each of the respective damping force variable shock absorbers responded on the real time base to the calculated target position P$_D$ to follow up the position P. The damping force according to the position P achieved during the time duration from the time $t_{20}$ to the time $t_{21}$ until the sprung mass vertical velocity $X_{2i'}$ exceeded the positive low damping force sprung mass vertical velocity threshold value $X_{2i01'}$ were still the minimum damping forces D/Fmin at both extension and compression phases. Consequently, the sprung mass vertical velocity $X_{2i'}$ during the time duration from the time $t_{20}$ to the time $t_{21}$ was not remarkably reduced.

H) Then, the sprung mass vertical velocity $X_{2i'}$ which exceeded the positive low damping sprung mass vertical velocity threshold value $X_{2i01'}$ at the time $t_{21}$ was further continued to be increased in the positive region. However, at a certain time between the times $t_{21}$ and $t_{22}$, the vertical velocity $X_{2i'}$ was turned to be decreased toward the zero point, the gradient of increase being reduced due to the favorable damping effect of each of the damping force variable shock absorbers. At the time $t_{22}$, the vertical velocity $X_{2i'}$ was decreased below the positive low damping sprung mass vertical velocity threshold value $X_{2i01'}$. At the next time $t_{23}$, the vertical velocity $X_{2i'}$ crossed the zero point. Then, the vertical velocity $X_{2i01'}$ was decreased in the negative region and, at a time $t_{24}$, passed the negative low damping sprung mass vertical velocity threshold value $-X_{2i01'}$. It is noted that, during the time duration from the time $t_{21}$ to the time $t_{22}$, the sprung mass vertical velocity $X_{2i'}$ did not exceed the positive sprung mass vertical velocity upper limit threshold value $X_{2i1'}$. During the time duration from the time at which the first sampling period to execute the routine shown in FIGS. 14A and 14B entered after the time $t_{21}$ to the time at which the sampling period to execute the routine shown in FIGS. 14A and 14B entered immediately before the time $t_{23}$, the same operational flow as that during the time duration from the time $t_{20}$ to the time $t_{21}$ was executed for each sampling period of the routine shown in FIGS. 14A and 14B except the step at which the increment of the value of the zero crossing counter CNT was executed. During the time duration from the time $t_{21}$ to the time $t_{22}$, since the vertical velocity $X_{2i'}$ exceeded the positive low damping sprung mass vertical velocity threshold value $X_{2i01'}$, the effective damping force D/F which accords with the direction and magnitude of the sprung mass vertical velocity $X_{2i'}$ was achieved since the dead zone width was eliminated. During the time duration from the time $t_{22}$ to the time $t_{23}$, the sprung mass vertical velocity $X_{2i'}$ was below the positive low damping sprung mass vertical velocity $X_{2i01'}$, so that both extension and compression phase damping forces D/F provided the minimum damping forces D/Fmin, thus the damping effect being reduced. However, since the normal control extension phase damping force D/F$_N$ derived from the time $t_{21}$ in which no dead zone width control was carried out was apparently smaller than the extension phase damping force D/F in which the dead zone width control was carried out, as denoted by the phantom line and solid line of FIG. 15E, so that the damping effect in the case of D/F$_N$ was estimated to be reduced against the sprung mass vertical velocity $X_{2i'}$ in the positive region. Furthermore, since in the case of the normal control extension phase damping force D/F$_N$ a time at which the damping force D/F$_N$ passed the minimum damping force D/Fmin became later than the time $t_{21}$ and a time at which the D/F$_N$ entered the minimum damping force D/Fmin became earlier than the time $t_{22}$. Furthermore, the damping effect of the damping force D/F$_N$ was remarkably reduced against the sprung mass vertical velocity $X_{2i'}$ was estimated to be further reduced.

At the first sampling period at which the routine shown in FIGS. 14A and 14B was executed after the time $t_{23}$, the routine was transferred to the step S7 at which the product between the present and previous values indicated negative in the same way as the time $t_{09}$, the routine was transferred to the step S9 in which the value of the zero crossing counter CNT was incremented by one to indicate the count value of "2". Since at the step S10 the count value of the zero crossing counter CNT was smaller than "5", the routine was transferred from the step S8 to the step S12 in which the positive and negative dead zone threshold values ($\pm X_{2i0'}$)

were continued to be set to the predetermined value ($\pm X_{2i00}$="0"). Since the vertical velocity $X_{2i'}$ was in the negative region, the target position $P_D$ which accords with the compression phase target position proportional coefficient $\alpha_1$ at the steps S15 through S21 via the step S14 was calculated and the control signal to follow up the target position $P_D$ was output which corresponds to the stepping variable Sj calculated at the steps S22 through S31. Thereafter. the sprung mass vertical velocity $X_{2i'}$ at the step S7 was continued to be negative and the product between the present value and previous value was continued to be positive so that the routine was transferred to the step S8. At the steps S16 through S27, the extension phase target position $P_D$ was calculated and the stepping variable Sj was output as the control signal to achieve the target position $P_D$ at the steps S22 through S31. The stepping motor for each of the respective damping force variable shock absorbers responded on the real time base to the calculated target position $P_D$ to follow up the position P. The damping forces corresponding to the position P achieved at the time duration from the time $t_{23}$ to the time $t_{24}$ were still the minimum damping forces at both of the extension and compression phases (D/Fmin) so that the effective damping against the sprung mass vertical velocity $X_{2i'}$ was not remarkably achieved.

I) Then, the negatively going sprung mass vertical velocity $X_{2i'}$ which exceeded the negative low damping sprung mass vertical velocity threshold value $(-X_{2i01'})$ at the time $t_{24}$ was turned to the increase direction at a certain time between the times $t_{24}$ and $t_{25}$ and increased above the negative low damping sprung mass vertical velocity threshold value $-X_{2i01'}$ at the time $t_{25}$. Furthermore, at a time $t_{26}$, the positively going vertical velocity crosses the zero point. Then, the vertical velocity $X_{2i'}$ was increased in the positive region and exceeded the positive low damping sprung mass vertical velocity threshold value $X_{2i' 01}$ at a time $t_{27}$.

During the time duration from a time after the time $t_{24}$ at which the first sampling period of the routine shown in FIGS. 14A and 14B was executed to a time immediately before the time $t_{26}$ at which the routine shown in FIGS. 14A and 14B was executed, whenever the routine shown in FIGS. 14A and 14B was executed, the same operational flow as the time duration From the time $t_{23}$ to the time $t_{24}$ was repeated except the value of the zero crossing counter CNT was incremented. During the time duration From the time $t_{24}$ to the time $t_{25}$, since the sprung mass vertical velocity $X_{2i'}$ was in excess (below) the negative low damping sprung mass vertical velocity threshold value $-X_{2i01'}$, the effective damping force D/F was emanated which accords with the direction and magnitude of the sprung mass vertical velocity $X_{2i'}$ due to the elimination of the dead zone. During the time duration From the time $t_{25}$ to the time $t_{26}$, the sprung mass vertical velocity $X_{2i'}$ was increased above the negative low damping sprung mass vertical velocity $-X_{2i01'}$ so that both of the extension and compression phase damping forces D/F were the minimum damping forces D/Fmin and the damping effect was reduced. However, since the normal control compression phase damping force $D/F_N$ was apparently smaller than the compression phase damping force D/F in which the width of the dead zone was controlled, as denoted by the phantom line and solid line of FIG. 15E, the damping effect of the normal control compression phase damping force against the negative sprung mass vertical velocity $X_{2i'}$ was estimated to be accordingly reduced. Furthermore, a time at which the damping force $D/F_N$ passed the minimum damping force D/Fmon became later than the time $t_{24}$ and a time at which the damping force $D/F_N$ enters the minimum damping force D/Fmin became earlier than the time $t_{25}$. Therefore, in the synergism action, the damping effect achieved by the damping force $D/F_N$ was remarkably reduced against the sprung mass vertical velocity $X_{2i'}$.

In addition, at the first sampling period at which the routine shown in FIGS. 14A and 14B was executed after the time $t_{26}$, the product between the present value and previous value of the sprung mass vertical velocity $X_{2i'}$ was negative at the step S7 in the same way as the previous time $t_{09}$ and the routine was transferred to the step S9 in which the value of the zero crossing counter CNT was incremented to indicate "3". At the step S10, the value of the counter CNT was smaller than "5". Therefore, the routine was transferred from the step S8 to the step S12 in which the positive and negative dead zone threshold values ($\pm X_{2i0'}$) were continued to be set to ($\pm X_{2i00}$=0). Since at the step S14, the sprung mass vertical velocity $X_{2i'}$ was positive, the routine was transferred from the step S14 to the steps S16 through S27 in which the target position $P_D$ which accords with the extension phase target position proportional coefficient $\alpha_2$ was calculated. The control signal to follow up the target position $P_D$ was output at the steps S22 through S31 as the stepping variable Sj. Thereafter, since the sprung mass vertical velocity $X_{2i'}$ was continued to be positive at the step S7 and the product between the present value and previous value thereof indicated positive, the routine was transferred to the step S8. Then. in the same way as described above, the extension phase target position $P_D$ was calculated at the steps S16 through S27 and at the steps S22 through S31 the control signal corresponding to the stepping variable Sj to achieve the target position $P_D$ was output. Correspondingly, the stepping motor for each of the damping force variable shock absorbers responded on the real time base to follow up the position P. The damping forces of the position P achieved during the time duration from the time $t_{26}$ to the time $t_{27}$ until the vertical velocity exceeded the positive low damping sprung mass vertical velocity threshold value $X_{2i01'}$ were the minimum damping forces D/Fmin both at the extension and compression phases. Thus, the sprung mass vertical velocity $X_{2i'}$ was not remarkably damped.

J) Next, the sprung mass vertical velocity $X_{2i'}$ which exceeded the positive low damping sprung mass vertical velocity threshold value $X_{2i01'}$ at the time $t_{27}$ was turned to be decreased in the positive region at a certain time between $t_{27}$ and $t_{28}$. At the time $t_{28}$, the sprung mass vertical velocity $X_{2i'}$ was decreased below the positive low damping sprung mass vertical velocity threshold value $X_{2i01'}$. At a time $t_{29}$, the sprung mass vertical velocity $X_{2i'}$ crossed the zero point and decreased in the negative region. At a time $t_{30}$, the vertical velocity $X_{2i'}$ passed the negative low damping sprung mass vertical velocity threshold value $(-X_{2i01'})$.

During the time duration from a time after the time $t_{27}$ at which the first sampling period of the routine shown in FIGS. 14A and 14B was executed to a time immediately before the time $t_{29}$ at which the routine shown in FIGS. 14A and 14B was executed, the same operational flow as the time duration from the time $t_{26}$ to the time $t_{27}$ was repeated for each sampling period $\Delta T$ except the increment of the value of the zero crossing counter CNT. During the time duration from the time $t_{27}$ to the time $t_{28}$. since the sprung mass vertical velocity $X_{2i'}$ exceeded the positive low damping sprung mass vertical velocity threshold value $X_{2i01'}$ , the effective damping force D/F was emanated which accords with the direction and magnitude of the sprung mass vertical velocity $X_{2i'}$ due to the elimination of the dead zone. During the time duration from the time $t_{28}$ to the time $t_{29}$, since the sprung mass vertical velocity $X_{2i'}$ was decreased below the positive low damping sprung mass vertical velocity threshold value $X_{2i01'}$ so that both extension and compression phase damping forces D/F were the minimum damping forces D/Fmin, thus the damping effect being reduced. However, in the case of the normal control extension phase damping force $D/F_N$ from the time $t_{27}$ in which no dead zone width control was carried out was not effectively emanated as shown in FIG. 15E. Thus, it was estimated that the damping effect in the case of $D/F_N$ was reduced against the positive sprung mass vertical velocity $X_{2i'}$.

At the first sampling period at which the routine shown in FIGS. 14A and 14B was executed after the time $t_{29}$, the product between the present and previous value at the step S7 indicated negative in the same way as the time $t_{09}$. At the step S9, the value of the zero crossing counter CNT was incremented to indicate "4". At the step S10, since the value of the zero crossing counter CNT was smaller than the predetermined value $CNT_0$, i.e., "5", the routine was transferred from the step S8 to the step S12 in which the positive and negative dead zone threshold values ($\pm X_{2io'}$) were continued to be set to the predetermined value ($\pm X_{2ioo}=0$). Next, since the sprung mass vertical velocity $X_{2i'}$ was negative, the target position $P_D$ was calculated which accords with the compression phase target position proportional constant (coefficient) $\alpha_1$ was calculated at the steps S15 through S21. The control signal to follow up the target position $P_D$ was output as the stepping variable Sj at the steps S22 through S31. Thereafter, since the sprung mass vertical velocity $X_{2i'}$ at the step S7 was continued to indicate negative and the product between the present value and previous value was continued to be positive so that the routine was transferred to the step S8. The extension phase target position $P_D$ was calculated at the steps S15 through S21. The control signal corresponding to the stepping variable Sj to achieve the calculated target position was output at the steps S22 through S31. The stepping motor for each damping force variable shock absorber responded on the real time base to the target position $P_D$ to follow up the position P. However, the damping forces of the position P achieved during the time duration from the time $t_{29}$ to the time $t_{30}$ until the sprung mass vertical velocity $X_{2i'}$ exceeded the negative low damping sprung mass vertical velocity threshold value ($-X_{2i01'}$) were the still minimum damping forces D/Fmin at both extension and compression phases so that the effective damping effect was not achieved against the sprung mass vertical velocity $X_{2i'}$.

K) Then, the sprung mass vertical velocity $X_{2i'}$ which was decreased below the negative low damping sprung 25 mass vertical velocity threshold value ($-X_{2i01'}$) at the time $t_{30}$ was turned toward the increase direction in the negative region at a certain time between $t_{30}$ and $t_{31}$. Then, the positively going sprung mass vertical velocity $X_{2i'}$ was increased above the negative low damping sprung mass vertical velocity threshold value ($-X_{2i01'}$) at the time $t_{31}$ and crossed the zero point at a time $t_{32}$. Then, the vertical velocity $X_{2i'}$ was increased in the positive region.

During the time duration from a time immediately after the time $t_{30}$ at which the first sampling period of the routine shown in FIGS. 14A and 14B was executed to a time immediately before the time $t_{32}$ at which the last sampling period of the routine was executed, the same operational flow as that during the time duration from the time $t_{29}$ to the time $t_{30}$ except the increment of the value of the zero crossing counter CNT was repeated for each sampling period $\Delta T$ at which the routine shown in FIGS. 14A and 14B was executed. During the time duration from the time $t_{30}$ to the time $t_{31}$, since the sprung mass vertical velocity $X_{2i'}$ was decreased below the negative low damping sprung mass vertical velocity threshold value ($-x_{2i01'}$), the effective damping force D/F was emanated which accords with the direction and magnitude of the sprung mass vertical velocity $X_{2i'}$ by the magnitude corresponding to the elimination of the dead zone. During the time duration from the time $t_{31}$ to the time $t_{32}$, since the sprung mass vertical velocity $X_{2i'}$ was above the negative low damping sprung mass vertical velocity threshold value ($-X_{2i01'}$), both of the extension and compression phase damping forces D/F were the minimum damping forces D/Fmin and the damping effects were reduced. However, the normal control compression phase damping force $D/F_N$ in which no dead zone width control was carried out was not effectively emanated, as shown in FIG. 15E (although no phantom line is shown), so that the damping effect on the sprung mass vertical velocity in the negative region was estimated to be reduced.

Hence, in the embodiment in which the dead zone width is narrowed (substantially, the dead zone is eliminated) after the time $t_{16}$ shown in FIG. 15B, the effective damping force was larger which accords with the magnitude and direction of the sprung mass vertical velocity $X_{2i'}$ than the damping force $D/F_N$ in the case where the dead zone width control is not carried out. In addition, since in the embodiment the time at which the damping forces at both extension and compression phases enter the low damping force range, namely, soft range (S—S range) becomes later and the time at which either of the extension or compression phase damping force passes the soft range becomes earlier so that the action duration of the effective damping force D/F becomes longer. Hence, as denoted by the phantom line of FIG. 15A, the sprung mass vertical velocity $X_{2i'\ N}$ in the case where no dead zone width control is carried out has still large amplitudes and long period during the time duration from the time $t_{16}$ to the proximity to the time $t_{32}$ so that the sprung mass, namely, the vehicle body is fluctuated. However, the sprung mass vertical velocity $X_{2i'}$ in the case of the embodiment speedily converges due to the favorable damping effect, as denoted by the solid line shown in FIG. 15A, and has smaller amplitude and shorter period so that the fluctuating sensation on the sprung mass, namely, the vehicle body is suppressed and, at the same time, a strong oscillating convergence force and solid sensation is given to the vehicular occupant.

L) At the first sampling period at which the routine shown in FIGS. 14A and 14B was executed after the time $t_{32}$, the product between the present value and previous value of the sprung mass vertical velocity $X_{2i'}$ at the step S7 was negative. At the step S9, the value of the zero crossing counter CNT was incremented by one to indicate "5". At the step S10, since the value of the zero crossing counter CNT was equal to the predetermined value $CNT_0$, the routine was transferred to the step S11 in which the zero crossing counter CNT was cleared and the dead zone width control flag F was reset to "0". Hence, at the subsequent step S13 transferred from the step S8, the positive and negative dead zone threshold values ($\pm X_{2io'}$) were set again to the initial values of ($\pm X_{210'}$). Next, the routine was transferred from the step S14 to the steps S16 through S27 in which the target position $P_D$ in accordance with the extension phase target position proportional coefficient (constant) $\alpha_2$ was calculated. Then, at the steps S22 through S31, the control signal to follow up the target position $P_D$ was output as the stepping variable Sj. Thereafter, since the sprung mass vertical velocity $X_{2i'}$ at the step S7 was continued to be positive, the product between the present value and previous value gave positive and the routine was transferred to the step S8. In the same way as described above, the extension phase target position $P_D$ was calculated at the steps S16 through S27. At the steps S22 through S31, the stepping variable Sj to achieve the target position $P_D$ was output as the control signal.

Anyway, the sprung mass vertical velocity $X_{2i'}$ during the time duration from the time $t_{32}$ to the time $t_{39}$ was relatively slow and minutely varied. Specifically, the sprung mass vertical velocity $X_{2i'}$ was increased in the positive region from the time $t_{32}$, was turned to be decreased at a certain time between $t_{32}$ and $t_{33}$. was crossed the zero point and decreased in the negative region at a time $t_{33}$, and was crossed the zero point and increased in the positive region at a time $t_{34}$.

Then, the sprung mass vertical velocity $X_{2i}$ repeated this trajectory until a time $t_{39}$. During this time duration from the time $t_{32}$ to the time $t_{39}$, the local maximums and minimums of the increasing and decreasing sprung mass vertical velocity $X_{2i'}$ did not exceed the initial value set dead zone threshold values ($\pm X_{2io'}$). Therefore, for each sampling period $\Delta T$ at which the routine shown in FIGS. 14A and 14B was executed, the routine was transferred from the step S4 to the step S6 and to the step S8. At the step S8, the dead zone width control flag F was reset to "0" and the routine was transferred to the step S13 in which the positive and negative dead zone threshold values ($\pm X_{2io'}$) were continued to be maintained at the initial values ($\pm X_{2io'}$). However, since the sprung mass vertical velocity $X_{2i'}$ did not exceed the dead zone threshold values ($\pm X_{2io'}$), the routine was transferred from either of the steps S15 through S21 or the steps S16 through S27 in which the target position $P_D$ was calculated and indicated zero. Hence, the stepping variable Sj as the control signal was "0" at the steps S22 through S31 for each sampling period $\Delta T$ at which the routine shown in FIGS. 14A and 14B was executed. Consequently, the damping forces emanated at the extension and compression phases were maintained at the minimum damping forces D/Fmin. The sprung mass vertical velocity $X_{2i'}$ during the time duration from the time $t_{32}$ to the time $t_{39}$ was relatively slow and minute as in the case of the time duration from the time $t_{00}$ to the time $t_{04}$ so that the sprung mass, namely, the vehicle body was slowly and minutely oscillated. Consequently, the smooth riding comfort with the heavy weight sensation can be achieved. During the time duration from the time $t_{32}$ to the time $t_{39}$, the stepping motors were not actuated so that the whole noise evaluation of the apparatus can be improved.

It is noted that, in the embodiment, the predetermined sprung mass vertical velocity values to set the control signal which does not actuate the actuator (stepping motor) are the positive and negative dead zone threshold values, the dead zone threshold values being changed to "0" when the sprung mass vertical velocity exceeds either of the positive or negative sprung mass vertical velocity upper or lower limit value so that, so-called, the dead zone width is eliminated as "0". However, since only narrowing such a non-actuation area of the actuator corresponding to the dead zone as described above can cause the damping effect against a large oscillation input to be enhanced, the variable damping force controlling apparatus and method according to the present invention can enhance the damping effect to present and suppress the fluctuating sensation by reducing the predetermined sprung mass vertical velocity values corresponding to the dead zone thresholds by predetermined quantities.

Although, in the embodiment, the valve body 31 used to control the damping force is formed in a rotary type, the valve body may be formed in a spool type and working fluid flow passages which are different between the extension phase and compression phase may be formed. In the latter case, a pinion may be linked to the rotary axle of each corresponding one of the stepping motors 41FL through 41RR and a rack to be meshed with the pinion may be attached onto the linkage rod 42. Alternatively, a slide position of the valve body 31 may be controlled with an electromagnetic solenoid applied to the valve body.

Although, in the embodiment, the vertical acceleration of the vehicle body is detected and the sky hook theory based control for the damping force is carried out on the basis of the detected vertical acceleration acted upon the vehicle body, a stroke sensor to detect a relative displacement between the vehicle body and corresponding one of the road wheels may additionally be installed. In this case, the damping coefficient C may be calculated using the following formula (9) on the basis of the relative velocity between the sprung mass and unsprung mass, the relative velocity $X_{Di'}$ being a differentiated value of the output signal indicating the relative displacement $X_{Di}$ between the vehicle body and corresponding one of the road wheels derived from the stroke sensor, and the vehicle body (sprung mass) vertical velocity $X_{2i'}$, the target position $P_D$ may be calculated, for example, using a table look-up technique referring to a table corresponding to FIG. 7 on the basis of the damping coefficient C, and the damping force may be controlled using the sky hook theory.

$$C = C_S \cdot (X_{2i'}/X_{Di'}) \qquad (9).$$

In the equation (9), $C_S$ denotes a previously set damper (shock absorber) damping coefficient.

Although, in the embodiment, the damping force control such as to suppress the posture variation of the vehicle body caused by the oscillation input from the road surface is described, such a damping force control that the running condition of the vehicle such as a braking condition of the vehicle body may be detected and the damping force control such as to suppress the posture variation of the vehicle body on the basis of the detected braking condition may be combined therewith.

In addition, the microcomputer 56 is used in the control unit of the variable damping force controlling apparatus, in the embodiment. However, electronic circuits such as arithmetic operation circuitry may be used or combined with the microcomputer.

Although, in the embodiment, the sprung mass vertical acceleration sensors 51FL through 51RR are disposed at the positions of the vehicle body 2 corresponding to the respective road wheels, namely, the front left road wheel 1FL, the front right road wheel 1FR, the rear left road wheel 1RL, and the rear right road wheel 1RR, any one of the sprung mass vertical acceleration sensors may be omitted and the sprung mass vertical acceleration at the omitted sensor position may be estimated from the output signals of the other sprung mass vertical acceleration sensors.

Furthermore, although, in the embodiment, the stepping motors 41FL through 41RR are controlled (actuated) in an open loop mode, the revolution angle of each of the stepping motors 41FL through 41RR may be detected by means of, e.g., an encoder, an output signal from the encoder being used to control the revolution angle of the corresponding one of the stepping motors in a feedback control mode.

Various advantages can be achieved according to the present invention.

What is claimed is:

1. A control apparatus for an automotive vehicle, comprising:

a) determining means for determining a behavior of a vehicle body and outputting a signal related to a sprung mass vertical velocity with respect to the vehicle body;

b) controlling means, responsive to the signal derived from said determining means, for calculating a damping force according to a magnitude and direction of the output signal from said determining means and for outputting a control signal corresponding to the calculated damping force;

c) actuating means, responsive to said control signal output from said controlling means, for actuating a valve body associated with said actuating means to rotate from a position through an angle to a target position determined according to a magnitude and direction of the control signal output from said controlling means;

d) damping means, interposed between a sprung mass member of the vehicle and an unsprung mass member of the vehicle and having the valve body, a piston assembly, and upper and lower working fluid chambers defined by said piston assembly, for providing a target damping force at least either of extension or compression phase determined according to the rotated target position of said valve body and whether said target damping force is exhibited at either of the extension phase or compression phase being dependent upon a vertical movement of the piston assembly with respect to the vehicle body;

e) dead zone setting means for setting positive and negative dead zone threshold values defining a dead zone in which said controlling means does not output said control signal to said actuating means according to the magnitude and direction of the output signal of said determining means so that said valve body is not rotated from said position and each of the damping forces at both extension and compression phases emanated from said damping means gives a minimum damping force;

f) positive and negative sprung mass vertical velocity upper and lower limit threshold value setting means for setting positive and negative sprung mass vertical velocity upper and lower limit threshold values, whose absolute values are larger than those of said positive and negative dead zone threshold values, said controlling means outputting the control signal to said actuating means so that said valve body is rotated to a maximum target position so as to provide a maximum damping force at either of said extension or compression phase depending on at least a direction of the output signal from said determining means when said output signal of said determining means becomes equal to or exceeded said either of positive or negative sprung mass vertical velocity upper or lower limit threshold value: and g) dead zone threshold value changing means for reducing an absolute value of at least either of said positive or negative dead zone threshold value by a predetermined value when said output signal of said determining means becomes equal to or exceeded either of said positive or negative sprung mass vertical velocity upper or lower limit threshold value.

2. A control apparatus for an automotive vehicle as claimed in claim 1, wherein said dead zone threshold value changing means reduces absolute values of both of said positive and negative dead zone threshold values by the predetermined value when said output signal of said determining means becomes equal to or exceeded either of said positive or negative sprung mass vertical velocity upper or lower limit threshold value.

3. A control apparatus for an automotive vehicle as claimed in claim 2, wherein said dead zone threshold value changing means reduces both said absolute values of the positive and negative dead zone threshold values by the predetermined value when said output signal of said determining means becomes equal to or exceeded either of said positive or negative sprung mass vertical velocity upper or lower limit threshold value, said predetermined value being such that both said absolute values of said positive and negative dead zone threshold values are equal to zero of the output signal of said determining means.

4. A control apparatus for an automotive vehicle as claimed in claim 3, wherein said determining means comprises: sprung mass vertical acceleration detecting means for detecting a sprung mass vertical acceleration and outputting a signal indicative of the sprung mass vertical acceleration; and sprung mass vertical velocity determining means for deriving the signal indicative of the sprung mass vertical velocity from the signal indicative of the sprung mass vertical acceleration.

5. A control apparatus for an automotive vehicle as claimed in claim 4, which further comprises: h) first determining means for determining whether the sprung mass vertical velocity indicative signal $X_{2i'}$ becomes equal to or exceeded a positive low damping force threshold value $X_{2i01'}$ below which the target position $P_D$ of the valve body causes the damping force at the extension phase to give a low damping force D/Fmin; i) second determining means for determining whether the sprung mass vertical velocity indicative signal $X_{2i'}$ becomes equal to or exceeded a negative low damping force threshold value $-X_{2i01'}$ above which the target position $P_D$ of the valve body causes the damping force at the compression phase to give the low damping force D/Fmin and wherein when said positive and negative dead zone threshold values are reduced to zeroes, both absolute values of the positive and negative low damping force threshold values $\pm X_{2i01'}$ are accordingly approached to zeroes.

6. A control apparatus for an automotive vehicle as claimed in claim 5, which further comprises j) counting means for counting number of times the sprung mass vertical velocity indicative signal has crossed its zero point and wherein said positive and negative dead zone threshold value changing means returns both of said positive and negative dead zone threshold values $\pm X_{2i0'}$ to their original values when a count value CNT of the counting means indicates a predetermined count value $CNT_0$.

7. A control apparatus for an automotive vehicle as claimed in claim 6, wherein said counting means comprises zero crossing determining means for determining whether a product between a present value $X_{2i'(n)}$ of the sprung mass vertical velocity indicative signal $X_{2i'}$ and a previous value $X_{2i'(n-1)}$ thereof indicates zero or negative and said counting means increments the count value thereof by one (CNT= CNT+1) when said zero crossing determining means determines that the product therebetween indicates zero or negative, the previous value $X_{2i(n-1)}$ being the value of the sprung mass vertical velocity indicative signal a predetermined sampling period before the present value $X_{2i'(n)}$ of the sprung mass vertical velocity indicative signal, and when an absolute value $|X_{2i'(n)}|$ of the present value is equal to or above the magnitude $X_{2i1'}$ of either of the positive or negative sprung mass vertical velocity upper or lower limit threshold value.

8. A control apparatus for an automotive vehicle as claimed in claim 7, which further comprises third determining means for determining whether the present value $X_{2i'(n)}$ of the sprung mass vertical velocity indicative signal is below zero and wherein said controlling means calculates an extension phase target position proportional coefficient $\alpha_2$ as follows, when said third determining means determines that the present value $X_{2i'(n)}$ indicates equal to zero of positive, $\alpha_2=(X_{2i'(n)}-X_{2i0'})/(X^{2i'MAX}-X^{2i0'})$, and calculates the target position of the valve body as follows: $P^D=\alpha^2 \cdot P^{MAX}$, wherein $P^{MAX}$ denotes an extension phase maximum position of the valve body at which the damping force of said damping means gives an extension phase maximum damping force.

9. A control apparatus for an automotive vehicle as claimed in claim 8, wherein said actuating means comprises a stepping motor associated with the valve body of the damping means and wherein said controlling means calculates a stepping variable S of the stepping motor as follows: $S=P^D \cdot P^A$, wherein $P^A$ denotes a present position of the valve body and outputs the control signal as the stepping variable S to the stepping motor.

10. A control apparatus for an automotive vehicle as claimed in claim 9, wherein said controlling means calculates a compression phase phase target position proportional coefficient $\alpha^1$ as follows, when said third determining means determines that the present value $X^{2i'(n)}$ indicates negative, $\alpha^1=(X^{2i'(n)}-(-X^{2i0'}))/(-X_{2i'MAX}-(-X_{2i0'}))$, and calculates the target position of the valve body as follows: $P_D=\alpha_1 \cdot -P_{MAX}$, wherein $-P_{MAX}$ denotes a compression phase maximum position of the valve body at which the damping force of said damping means gives a compression phase maximum damping force and wherein said controlling means calculates a stepping variable S of the stepping motor as follows: $S=P_D \cdot P_A$, wherein $P_A$ denotes a present rotated position of the valve body and outputs the control signal as the stepping variable S to the stepping motor.

11. A control apparatus for an automotive vehicle as claimed in claim 10, wherein said controlling means comprises fourth determining means for determining whether the calculated extension phase target position proportional coefficient $\alpha_2$ indicates one or more and first setting means for forcefully setting the extension phase target position proportional coefficient $\alpha_2$ to one when said fourth determining means determines that the calculated extension phase target position proportional coefficient $\alpha_2$ indicates one or more and fifth determining means for determining whether the calculated extension phase target position proportional coefficient $\alpha_2$ indicates zero or negative and second setting means for forcefully setting the extension phase target position proportional coefficient $\alpha_2$ to zero when said fifth determining means determines that the calculated extension phase target position proportional coefficient $\alpha_2$ indicates zero or negative.

12. A control apparatus for an automotive vehicle as claimed in claim 11, wherein said controlling means comprises sixth determining means for determining whether the calculated compression phase target position proportional coefficient $\alpha_1$ indicates one or more and third setting means for forcefully setting the compression phase target position proportional coefficient $\alpha_1$ to one when said sixth determining means determines that the calculated compression phase target position proportional coefficient $\alpha_1$ indicates one or more and seventh determining means for determining whether the calculated compression phase target position proportional coefficient $\alpha_1$ indicates zero or negative and fourth setting means for forcefully setting the compression phase target position proportional coefficient $\alpha_1$ to zero when said seventh determining means determines that the calculated compression phase target position proportional coefficient $\alpha_1$ indicates zero or negative.

13. A control apparatus for an automotive vehicle as claimed in claim 12, wherein said controlling means further comprises eighth determining means for determining whether an absolute value |S| of the calculated stepping variable for the stepping motor is equal to or below $S_{MAX}$, $S_{MAX}$ denoting a maximum stepping variable achieved by a calculation processing executed once for each predetermined sampling period, and wherein said controlling means outputs directly the stepping variable S when said eighth determining means determines that the absolute value |S| indicates equal to or below $S_{MAX}$ and ninth determining means for determining whether the value of the calculated stepping variable S is above zero when the absolute value of the calculated stepping variable |S| is above $S_{MAX}$ and wherein said controlling means outputs the stepping variable S as $S_{MAX}$ to the stepping motor ($S=S_{MAX}$) when the ninth determining means determines that the value of the stepping variable S is above zero and outputs the stepping variable S to the stepping motor as $-S_{MAX}$ to the stepping motor ($S=-S_{MAX}$) when said ninth determining means determines that the value of the stepping variable S is equal to or below zero.

14. A control apparatus for an automotive vehicle as claimed in claim 13, wherein said controlling means further comprises updating means for updating the present value $X_{2i'(n)}$ of the sprung mass vertical velocity to the previous value $X_{2i'(n-1)}$ after said controlling means outputs the stepping variable S to the stepping motor.

15. A control apparatus for an automotive vehicle as claimed in claim 14, wherein said predetermined count value of the counting means is five and wherein said predetermined sampling period is 3.3 msec.

16. A control apparatus for an automotive vehicle as claimed in claim 15, wherein said damping means comprises a plurality of shock absorbers interposed between the vehicle body and corresponding road wheels, said vertical acceleration detecting means comprises a plurality of vertical G sensors located on parts of the vehicle body which are adjacent to corresponding shock absorbers, and wherein said sprung mass vertical velocity determining means derives the sprung mass vertical velocities $X_{2i'}$ using integrations for the correspondingly detected sprung mass vertical acceleration indicative signals, wherein i denotes any one of positions (FL, FR, RL, or RR) of the road wheels at the vehicle body.

17. A method for controlling a damping force emanated from a vehicular shock absorber interposed between a sprung mass member and an unsprung mass member of a vehicle, the method comprising the steps of:
  a) determining a behavior of a vehicle body and outputting a signal related to a sprung mass vertical velocity with respect to the vehicle body;
  b) responsive to the signal derived from said step a), calculating a damping force according to a magnitude and direction of the output signal from said step a) and outputting a control signal corresponding to the calculated damping force;
  c) responsive to said control signal output from said step b), actuating a valve body installed within the shock absorber to rotate from a position through an angle to a target position determined according to a magnitude and direction of the control signal output from said step b);
  d) providing a target damping force at least either of extension or compression phase determined according to the rotated target position of said valve body, whether the controlled target position at either of the extension and compression phase depending upon a direction of a piston assembly installed with the valve body in the shock absorber;

e) setting positive and negative dead zone threshold values defining a dead zone in which, at said step b), said control signal is not output at the step c) according to the magnitude and direction of the output signal of said step a) that said valve body is not rotated from said position and each of the damping forces at both extension and compression phases emanated from said shock absorber gives a minimum damping force;

f) setting positive and negative sprung mass vertical velocity upper and lower limit threshold values, whose absolute values are larger than those of said positive and negative dead zone threshold values, at said step c), the control signal being output at said step d) so that said valve body is rotated to a maximum target position so as to provide a maximum damping force at either of said extension or compression phase depending on the direction of the output signal from said step a) when said output signal of said step a) becomes equal to or exceeded said either of positive or negative sprung mass vertical velocity upper or lower limit threshold value; and g) reducing an absolute value of at least either of said positive or negative dead zone threshold value by a predetermined value when said output signal of said step a) becomes equal to or exceeded either of said positive or negative sprung mass vertical velocity upper or lower limit threshold value.

* * * * *